(12) United States Patent
Hubenig

(10) Patent No.: US 11,699,094 B2
(45) Date of Patent: Jul. 11, 2023

(54) AUTOMATIC FEATURE SELECTION AND MODEL GENERATION FOR LINEAR MODELS

(71) Applicant: Salesforce, Inc., San Francisco, CA (US)

(72) Inventor: Paul Walter Hubenig, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 1218 days.

(21) Appl. No.: 16/177,107

(22) Filed: Oct. 31, 2018

(65) Prior Publication Data

US 2020/0134363 A1    Apr. 30, 2020

(51) Int. Cl.
| | | |
|---|---|---|
| *G06N 3/08* | (2023.01) | |
| *G06F 15/18* | (2006.01) | |
| *G06N 20/00* | (2019.01) | |
| *G06F 17/17* | (2006.01) | |
| *G06N 7/00* | (2023.01) | |
| *G06F 18/2115* | (2023.01) | |
| *G06F 18/20* | (2023.01) | |

(52) U.S. Cl.
CPC .............. *G06N 20/00* (2019.01); *G06F 17/17* (2013.01); *G06F 18/2115* (2023.01); *G06F 18/285* (2023.01); *G06N 7/00* (2013.01)

(58) Field of Classification Search
CPC .... G06K 9/6231; G06K 9/6227; G06F 17/17; G06N 7/00; G06N 3/126; G06N 5/003; G06N 20/00
See application file for complete search history.

(56) References Cited

U.S. PATENT DOCUMENTS

| | | | |
|---|---|---|---|
| 7,058,658 B2 * | 6/2006 | Mentzer ................. | G16B 50/10 |
| | | | 435/6.1 |
| 7,664,616 B2 * | 2/2010 | Wittkowski ............ | G06F 17/18 |
| | | | 702/179 |

(Continued)

FOREIGN PATENT DOCUMENTS

| | | | | |
|---|---|---|---|---|
| CA | 2505904 A1 * | 10/2005 | ......... | G06F 16/9535 |
| CA | 2810794 A1 * | 11/2011 | ............... | G06T 5/00 |

(Continued)

*Primary Examiner* — Philip P. Dang
(74) *Attorney, Agent, or Firm* — Holland & Hart LLP

(57) ABSTRACT

Methods, systems, and devices for automated feature selection and model generation are described. A device (e.g., a server, user device, database, etc.) may perform model generation for an underlying dataset and a specified outcome variable. The device may determine relevance measurements (e.g., stump R-squared values) for a set of identified features of the dataset and can reduce the set of features based on these relevance measurements (e.g., according to a double-box procedure). Using this reduced set of features, the device may perform a least absolute shrinkage and selection operator (LASSO) regression procedure to sort the features. The device may then determine a set of nested linear models—where each successive model of the set includes an additional feature of the sorted features—and may select a "best" linear model for model generation based on this set of models and a model quality criterion (e.g., an Akaike information criterion (AIC)).

20 Claims, 12 Drawing Sheets

(56) References Cited

U.S. PATENT DOCUMENTS

| | | | | |
|---|---|---|---|---|
| 8,412,461 | B2* | 4/2013 | Gustafsson | G16B 20/00 703/11 |
| 8,554,703 | B1* | 10/2013 | Lin | G06N 20/00 706/12 |
| 8,706,656 | B1* | 4/2014 | Lin | G06N 20/00 706/45 |
| 8,843,427 | B1* | 9/2014 | Lin | G06N 20/00 705/16 |
| 8,892,409 | B2* | 11/2014 | Mun | G06Q 40/06 703/2 |
| 9,020,857 | B2* | 4/2015 | Mun | G06F 17/18 705/348 |
| 9,542,646 | B1* | 1/2017 | Baughman | G06N 20/00 |
| 9,589,277 | B2* | 3/2017 | Zhang | G06Q 30/0256 |
| 9,760,933 | B1* | 9/2017 | Cai | G06Q 30/0627 |
| 9,811,794 | B2* | 11/2017 | Mun | G06Q 10/0635 |
| 9,881,339 | B2* | 1/2018 | Mun | G06Q 40/06 |
| 10,026,203 | B2* | 7/2018 | Bruder | A61B 6/405 |
| 10,304,008 | B2* | 5/2019 | Min | G06F 17/16 |
| 10,453,142 | B2* | 10/2019 | Mun | G06Q 40/08 |
| 10,454,556 | B2* | 10/2019 | Kim | H04B 7/0469 |
| 10,736,566 | B2* | 8/2020 | Sazonov | G06N 7/01 |
| 10,909,691 | B2* | 2/2021 | Datta | G06T 7/66 |
| 11,020,025 | B2* | 6/2021 | Datta | A61B 5/1128 |
| 2004/0218837 | A1* | 11/2004 | Shiyama | G06F 16/5838 382/181 |
| 2006/0110073 | A1* | 5/2006 | Matsushita | G06V 10/754 707/E17.02 |
| 2011/0301448 | A1* | 12/2011 | deCharms | G01R 33/4806 600/410 |
| 2012/0158633 | A1* | 6/2012 | Eder | G16H 15/00 707/E17.014 |
| 2012/0191630 | A1* | 7/2012 | Breckenridge | G06N 20/00 706/12 |
| 2013/0142060 | A1* | 6/2013 | Challa | H04J 4/00 370/252 |
| 2013/0246086 | A1* | 9/2013 | Mun | G16H 70/20 705/2 |
| 2014/0274891 | A1* | 9/2014 | Caffrey | A61K 38/1709 514/6.9 |
| 2014/0324521 | A1* | 10/2014 | Mun | G06Q 30/0201 705/7.28 |
| 2016/0004664 | A1* | 1/2016 | Bouchard | G06F 17/16 708/290 |
| 2016/0148251 | A1* | 5/2016 | Thomas | G06Q 30/0244 705/14.43 |
| 2019/0355473 | A1* | 11/2019 | Schobel | G16H 50/30 |

FOREIGN PATENT DOCUMENTS

| | | | | |
|---|---|---|---|---|
| EP | 1473924 A2 | * | 11/2004 | G06F 16/50 |
| EP | 2668545 A1 | * | 12/2013 | G05B 17/02 |
| WO | WO-2006125960 A2 | * | 11/2006 | G06K 9/0051 |
| WO | WO-2014145836 A1 | * | 9/2014 | A61K 38/1709 |
| WO | WO-2015094545 A1 | * | 6/2015 | G06Q 40/06 |
| WO | WO-2015121028 A1 | * | 8/2015 | B32B 5/00 |
| WO | WO-2015137970 A1 | * | 9/2015 | G06Q 10/04 |

* cited by examiner

AUTOMATIC FEATURE SELECTION AND MODEL GENERATION FOR LINEAR MODELS

FIELD OF TECHNOLOGY

The present disclosure relates generally to database systems and data processing, and more specifically to automatic feature selection and model generation for linear models.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, CRM solutions, among other solutions, may benefit from data analytics. Applications supporting artificial intelligence (AI) enhanced data analytics may greatly increase the scope of data processing and model generation by automating much of the data analysis process. However, a user operating such a data analytics application may need extensive training or a strong background in data science to understand the analysis and provide accurate information during user input steps. For example, many data analytics applications may require a user to greatly reduce a list of possible features for analysis to aid in model generation. However, without both a strong understanding of data science and the underlying dataset, the user may not be able to select features that will result in a close-to-optimal model.

Furthermore, for large datasets (e.g., datasets with thousands or millions of data records), data analytics may require a huge processing and memory overhead. This also may result in significant latency within the system, especially if the processing scales with the size of the dataset. As such, an interactive data analytics application may not be feasible for large datasets, as the processing timeline for data analysis may be on the scale of minutes, hours, or even days. Some data analytics applications may limit the size of the datasets used or may include encoded assumptions about the data analysis to reduce the latency and memory overhead involved in model generation. However, such applications may limit the applicability of the data analysis and reduce the accuracy of the generated models.

DETAILED DESCRIPTION

Figure 1:
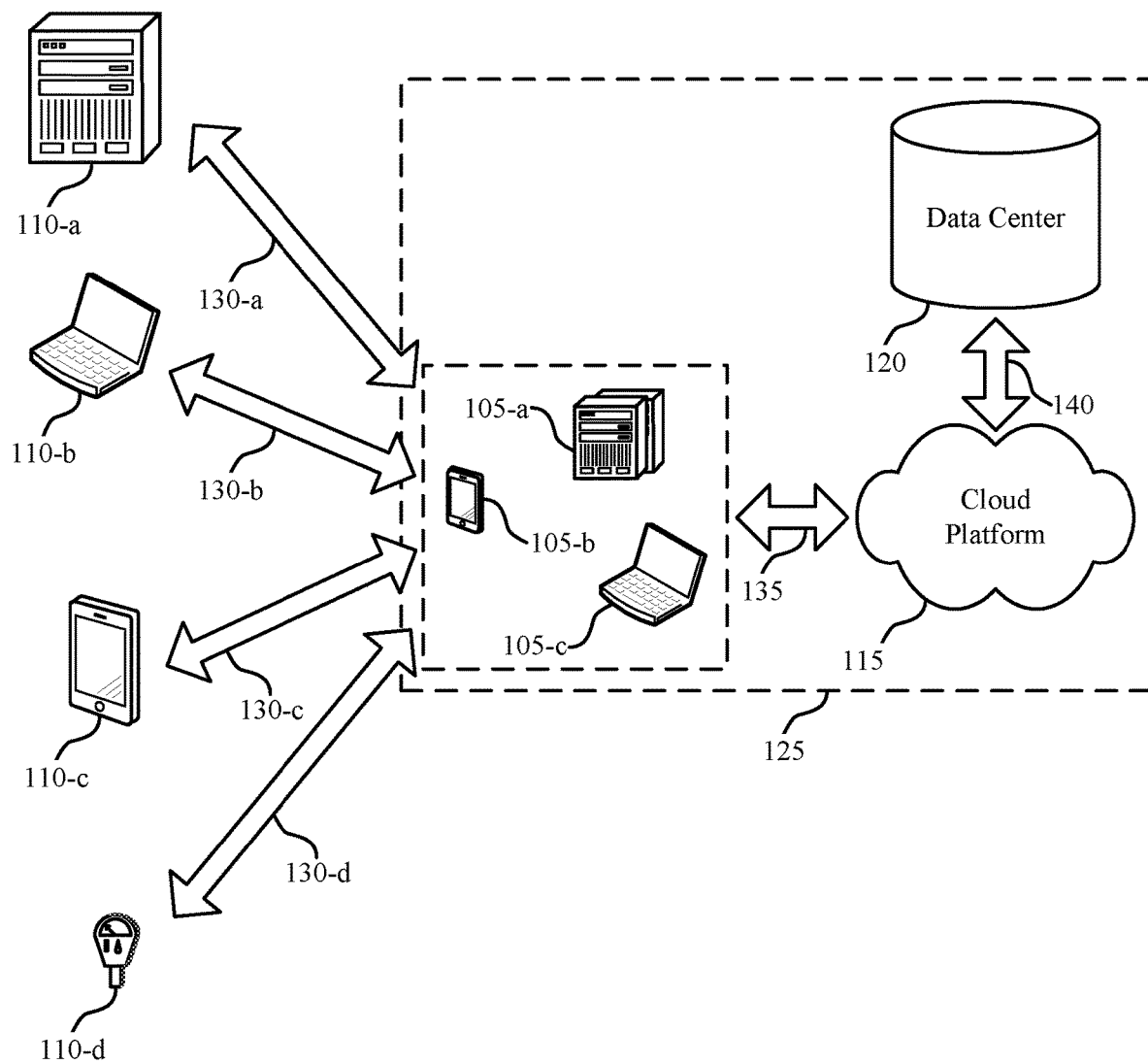
FIG. 1 illustrates an example of a system for cloud computing that supports automatic feature selection and model generation for linear models in accordance with aspects of the present disclosure.

Some systems (e.g., systems supporting customer relationship management (CRM) and one or more datasets) may support a user-friendly, interactive data analytics application. Such an application may perform model generation to determine insights about features of a dataset. To reduce the processing and memory overhead associated with performing the model generation (e.g., linear model generation), including automatic feature selection, the application may implement a number of techniques and procedures that efficiently handle very large datasets and extensive sets of data features. Additionally, the techniques and procedures may reduce the latency involved with determining a non-regularized, close-to-optimal linear model, allowing a user to perform interactive data analysis using the application without long wait times (e.g., on the scale of minutes, hours, or days) due to processing huge and/or complex datasets for model generation.

A device (e.g., a user device, server, server cluster, database, etc.) may perform any combination of the following techniques and procedures to perform automatic feature selection and model generation. For example, the device may perform linear model generation for a particular outcome variable based on an underlying dataset. In a first procedure, the device may determine a set of relevant features (e.g., relevant to the specified outcome variable) for further analysis. Features may be examples of descriptive aspects of data records within the dataset. The device may determine a relevance measurement or metric (e.g., a stump R-squared value) for each feature in an initial set of features, where the initial set of features may be user-defined or determined based on the dataset for analysis. The device may then select a subset of these features based on the relevance measurements in a "first cut" procedure. In one specific example, the device may select the features sensitive to a curve defined by the features, sorted in decreasing order of relevance measurements, versus the relevance measurements (e.g., using a least squares double-box selection technique). The resulting subset of features may be used as a base set of features for testing linear models.

The device may perform a priority sort on this base set of features using a series of L1 regularizations. This series of L1 regularizations may be referred to as a least absolute shrinkage and selection operator (LASSO) regression procedure. To perform the LASSO regression, the device may generate a matrix based on the base set of features by iteratively scanning the data records of the dataset out-of-core (i.e., without the device storing the dataset in memory). Using this matrix and a continuously increasing penalty parameter, the device may determine an order that feature coefficients for the base set of features go to zero as the penalty parameter increases. The device may sort the base set of features according to this order (e.g., where the features that are set to zero last are given highest priority and the features that are set to zero first are given lowest priority). Based on the sorted features, the device may identify a set of nested models using these features, where each successive model in the set is based on one additional feature according to the sorted order. The device may select one model from this set of linear models based on a model quality criterion (e.g., an Akaike information criterion (AIC)). In some cases, the device may implement a rake optimization technique to reduce the processing overhead associated with computing the model quality criterion values for the nested models. The device may output the selected linear model as the final result of the model generation procedure.

A user may use this close-to-optimum model for data analysis and predictive purposes, where the features corresponding to this model are the determined predictor variables for the specified outcome variable. Additionally, due to one or more of the procedures and techniques used in the linear model generation, the device may generate the model without storing the dataset in memory and with limited (e.g., two) scans of the dataset. As such, the linear model generation has a low processing and memory overhead and a fast turnaround time (e.g., less than a minute), supporting interactive analysis of huge datasets (e.g., datasets with millions of data records).

Aspects of the disclosure are initially described in the context of an environment supporting an on-demand database service. Additional aspects are described with reference to feature selection procedures, an iterative matrix generation process, a rake technique, and a process flow. Aspects of the disclosure are further illustrated by and described with reference to apparatus diagrams, system diagrams, and flowcharts that relate to automatic feature selection and model generation for linear models.

FIG. 1 illustrates an example of a system 100 for cloud computing that supports automatic feature selection and model generation for linear models in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-*a*), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

Some systems 100 may support a user-friendly, interactive data analytics application. Such an application may perform model generation to determine insights about features of a dataset (e.g., a dataset stored in the data center 120). To reduce the processing and memory overhead associated with performing model generation the application may implement a number of techniques and procedures that efficiently handle very large datasets and extensive sets of data features. Additionally, the techniques and procedures may reduce the latency involved with determining a non-regularized, close-to-optimal linear model, allowing a user to perform interactive data analysis using the application without long wait times (e.g., on the scale of minutes, hours, or days) due to processing huge and/or complex datasets for model generation.

A device (e.g., any component of subsystem 125, such as a cloud client 105, a server or server cluster associated with the cloud platform 115 or data center 120, etc.) may perform any combination of the following techniques and procedures to perform automatic feature selection and model generation. For example, the device may perform linear model generation for a particular outcome variable based on an underlying dataset. Model creation may involve determining an optimal or close-to-optimal model based on set of possible features. A feature may be an example of a descriptive aspect of a data record in a dataset. Large or complex sets of features may introduce many challenges to model generation due to the number of combinatorial possibilities (e.g., for 100 features, the number of distinct feature combinations is on the scale of $10^{30}$), redundancies between features, cooperation between features, or some combination of these or other aspects of the features. An optimal or close-to-optimal model may be based on a tradeoff between usefulness and complexity. For example, using too few features as predictive variables for the model may limit the usefulness of the model. However, using too many features may result in an overly complex model and, in some cases, may actually limit the usefulness as well. For example, including too many features in a model (e.g., above some feature threshold) may result in a propagation of uncertainty, risk multicollinearity between the features, dilute the effects of the features, overfit the model, reduce interpretability, or result in some combination of these issues. Accordingly, the model generation procedure may involve determining an optimal or close-to-optimal model that uses the least number of features for the greatest predictive power.

In a first procedure for linear model generation, the device may determine a set of relevant features (e.g., features relevant to the specified outcome variable) for further analysis. The device may determine a relevance measurement or metric (e.g., a stump R-squared value) for each feature in an initial set of features, where the initial set of features may be user-defined or determined based on the dataset for analysis. The device may then select a subset of these features based on the relevance measurements in a "first cut" procedure. In one specific example, the device may select the features sensitive to a curve defined by the features, sorted in decreasing order of relevance measurements, versus the relevance measurements (e.g., using a least squares double-box selection technique). The resulting subset of features may be used as a base set of features for testing linear models. Based on this first cut, the device may greatly reduce the number of features for consideration and, correspondingly, the processing and memory resources needed for the following steps of model generation.

The device may perform a priority sort on this base set of features using a series of L1 regularizations. This series of L1 regularizations may be referred to as a LASSO regression procedure. To perform the LASSO regression, the device may generate a matrix based on the base set of features by iteratively scanning the data records of the dataset out-of-core (i.e., without the device storing the dataset in memory). Using this matrix and a continuously increasing penalty parameter, the device may determine an order that feature coefficients for the base set of features go to zero as the penalty parameter increases. The device may sort the base set of features according to this order (e.g., where the features that are set to zero last are given highest priority and the features that are set to zero first are given lowest priority). Based on the sorted features, the device may identify a set of nested models using these features, where each successive model in the set is based on one additional feature according to the sorted order. The device may select one model from this set of linear models based on a model quality criterion (e.g., an AIC). In some cases, the device may implement a rake optimization technique to reduce the processing overhead associated with computing the model quality criterion values for the nested models. The device may output the selected linear model as the result of the model generation procedure.

A user may use this close-to-optimum model for data analysis and predictive purposes, where the features corresponding to this model are the determined predictor variables for the specified outcome variable. Additionally, due to one or more of the procedures and techniques used in the linear model generation, the device may generate the model without storing the dataset in memory and with limited (e.g., two) scans of the dataset. For example, a first scan may determine the relevance measurements for the initial set of features and a second scan may determine a sorted order for the base set of features (i.e., a subset of the initial set of features). As such, the linear model generation has a low processing and memory overhead and a fast turnaround time (e.g., less than a minute), supporting interactive analysis of huge datasets (e.g., datasets with millions of data records).

Some conventional systems may implement data analytics applications that require users to have extensive training or a strong background in data science to understand the analysis and provide accurate information during user input steps. For example, many data analytics applications require a user to greatly reduce a list of possible features for analysis to aid in model generation. However, without both a strong understanding of data science and the underlying dataset, the user may not be able to select features that will result in a close-to-optimal model. Furthermore, for large datasets (e.g., datasets with thousands or millions of data records), these data analytics applications may require a huge processing and memory overhead. This also can result in significant latency within the conventional system, especially if the processing scales with the size of the dataset. As such, an interactive data analytics application may not be feasible for large datasets, as the processing timeline for data analysis can be on the scale of minutes, hours, or even days.

Some data analytics applications limit the size of the datasets used or include encoded assumptions about the data analysis to reduce the latency and memory overhead involved in model generation. However, such applications also limit the applicability of the data analysis and reduce the accuracy of the generated models.

In contrast, system 100 implements procedures and techniques for model generation that reduce the burden on the user while also limiting the memory overhead, the processing overhead, and the associated latency. For example, the system 100 supports fast, automated feature selection that is not based on assumptions about the data—so a device may automatically select features to include in a model for any type of dataset—and that does not need the user to understand the interactions between features for close-to-optimal feature selection. Furthermore, because the processes do not scale with the size of the dataset, the system 100 may support fast model generation for huge, complex datasets while maintaining the interactive aspects of the data analytics application (e.g., because model generation may occur in a few seconds as opposed to a few hours). By implementing parallel processes, the device may scan the dataset twice to perform the entire model generation procedure, further reducing latency and processing overhead. Also, by accessing the dataset out-of-core rather than in memory, the memory overhead at the processing device may be low for any size dataset (e.g., even datasets with millions of data records).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
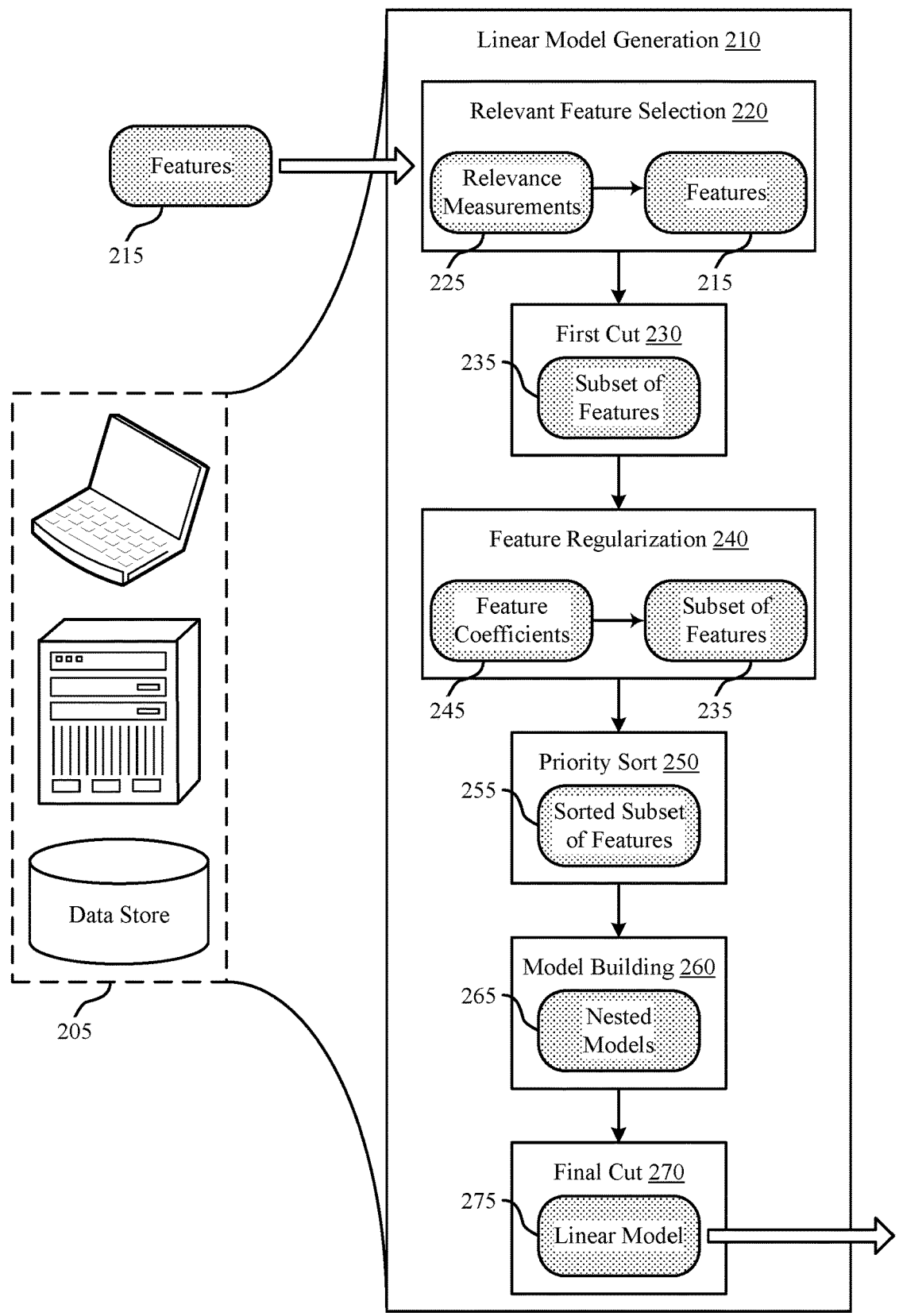
FIG. 2 illustrates an example of a feature selection procedure that supports automatic feature selection and model generation for linear models in accordance with aspects of the present disclosure.

FIG. 2 illustrates an example of a feature selection procedure 200 that supports automatic feature selection and model generation for linear models in accordance with various aspects of the present disclosure. The feature selection procedure 200 may be performed by a device 205, such as a user device, a server (e.g., an application server, a database server, a server cluster, a virtual machine, a container, etc.), a data store, or some combination of these or similar devices. In some cases, the device 205 may be a component of a subsystem 125 as described with reference to FIG. 1. The device 205 may perform linear model generation 210 to generate a linear model 275 based on a set of possible features 215. For example, using a number of techniques, the device 205 may select a subset of the features 215 to include as variables in the generated linear model 275. In some cases, a device 205 may implement all of the techniques described herein to perform linear model generation 210. In other cases, the device 205 may implement a subset of the described techniques or may implement additional techniques to support linear model generation 210.

The device 205 may support computer aided data science, which may be performed by an artificial intelligence (AI) enhanced data analytics framework. In a first example, the device 205 may run an application for AI-enhanced data analytics (e.g., in a webpage of a web browser). In a second example, the device 205 may perform backend processing for AI-enhanced data analytics. AI-enhanced data analytics may determine and surface insights about datasets stored in one or more databases, such as a multi-tenant database system. For example, the AI-enhanced data analytics may support user interaction, such that a user may guide or provide inputs for a data analysis procedure, and the device 205 may perform the analytics and determine findings for display. These findings may include statistically significant phenomena (e.g., based on automated data mining), causes or drivers of outcomes of interest, suggestions for how to improve analysis results, or some combination of these or other relevant data analysis findings.

One specific function of the data analytics framework is model generation. Model generation (i.e., model building) may involve receiving user input and performing automation processes using datasets of interest. For example, a user may specify a dataset for analysis, an outcome of interest, a set of relevant features 215, a type of model for creation (e.g., a linear model), or any other user-defined inputs. The device 205 may receive the user inputs and may perform a number of processes based on these inputs to generate a model that can be used to predict a particular outcome. For example, a linear model 275 may include an outcome variable and a number of predictor variables and weights for each of these predictor variables. Based on input values for the predictor variables, the linear model 275 calculates a predicted value for the outcome variable. In some cases, the model generation process may involve iterative steps, where a user may input information at one or more of the steps in the linear model generation 210 process to aid in the model building.

The device 205 may be an example of a general analysis machine and, as such, may perform data analytics and model generation based on values in datasets rather than encoded assumptions about the nature of the data or the problem for analysis. That is, so that a user can use the device 205 to generate models for a wide variety of predictive outcomes, the model generation may operate based on integer or decimal values, as opposed to hardcoded logic specific to any one field. In this way, the device 205 may perform data analytics for multiple use cases (e.g., market penetration, profit margins in a supply-chain, customer satisfaction, etc.). Additionally, the device 205 may handle any datasets indicated by a user, including datasets that may contain bad (e.g., inaccurate), incomplete, insufficient, or collinear data. The linear model generation 210 may support operation by users with limited data science experience based on automated procedures for fast, efficient feature selection resulting in robust linear models 275.

Automated feature selection for linear model generation 210 may involve the device 205 identifying a set of features 215 (e.g., data features) from a dataset for analysis. A feature may be a descriptive aspect of a data record in the dataset. For example, a data record storing information for a car may include multiple data features associated with that specific car, such as the make, model, weight, number of cylinders, color, year, miles-per-gallon, top speed, four-wheel drive capability, etc. for the car. Each feature may be an example of a categorical variable or a quantitative variable. In some cases, every data record in a dataset may include a value for each feature of the set of features 215. In other cases, the dataset may contain data records with values for different features, where some data records may not include a value for each feature of the set of features 215.

In some cases, these features 215 may include all features associated with a set of data records for data analysis. In other cases, the device 205 or a user may perform a pre-screening process to reduce a total set of features down to the set of features 215 for processing. The device 205 may store an indication of the features 215 for analysis and may perform relevant features selection 220. Relevant features selection 220 may involve determining a set of relevance measurements 225 corresponding to the set of features 215. These relevance measurements 225 may be examples of stump R-squared values for the features 215. For improved efficiency of the relevant feature selection 220, the device 205 may calculate the R-squared values for all of the features 215 in parallel using a single scan of the dataset for analysis. The device 205 may then sort the set of features 215 according to the computed relevance measurements 225 (e.g., the stump R-squared values).

The device 205 may use the calculated relevance measurements 225 to perform a first cut 230 on the set of features 215 to reduce the number of features for analysis down to a subset of features 235. For example, the device 205 may select a subset of features 235 with the highest stump R-squared values. In one example, the device 205 may map the sorted set of features 215 against the calculated relevance measurements 225 and may select the subset of features 235 based on the resulting curve. For example, the device 205 may fit a box to the curve using a least squares analysis, where any features contained within the box are added to the subset of features 235 for further analysis. In some cases, the device 205 may map one or more further boxes to the curve to select additional features for the subset of features 235. For example, the device 205 may fit a second box to the curve using a second least squares analysis of the remaining terms (e.g., the features not contained within the first box). The number of boxes used for the first cut 230 may be based on a user input or a static or dynamic selection threshold. In a second example, the device 205 may select the subset of features 235 based on a threshold number of features or a threshold relevance metric. For example, if the device 205 contains a pre-configured or user-specified threshold number of features for the subset of features 235, the device 205 may select the specified number of features with the highest relevance measurements 225. If the device 205 contains a pre-configured or user-specified threshold relevance metric, the device 205 may select all features of the set of features 215 with corresponding relevance measurements 225 equal to or greater than the threshold relevance metric. In any of these examples, the first cut 230 may result in a subset of features 235 more likely to be relevant for the final linear model 275. For example, the first cut 230 may narrow a set of features 215 from hundreds or thousands of features to a subset of features 235 containing tens or hundreds of features using a single scan of the dataset for analysis.

This subset of features 235 may be sorted based on feature regularization 240 and a corresponding priority sort 250. For example, in feature regularization 240, the device 205 may select feature coefficients 245 for the subset of features 235. The device 205 may submit the subset of features 235—and the corresponding feature coefficients 245—to an increasing stress parameter (i.e., a penalty term or value) which forces the feature coefficients 245 to zero. By continuously increasing the stress parameter, the device 205 may force all of the feature coefficients 245 to equal zero, and the device 205 may determine the order in which each of these feature coefficients 245 goes to zero. However, rather than use this feature regularization 240 procedure to create a model, the device 205 may sort the subset of features 235 according to the order of the feature coefficients 245 reaching zero. This priority sort 250 may result in a sorted subset of features 255, where the order of the sorted features is dependent on how relevant the features are to the outcome of the model and how correlated the features are to the other features in the subset. The device 205 may perform the feature regularization 240 and the priority sort 250 using a single scan of the dataset.

The device 205 may perform model building 260 to determine a set of nested models 265 based on the sorted subset of features 255. Each successive model in the set of nested models 265 includes an additional feature of the sorted subset of features 255 as a predictor variable. That is, the first model in the set of nested models 265 may include the first feature of the sorted subset of features 255 as a predictor variable, the second model may include the first and second features of the sorted subset of features 255 as predictor variables, the third model may include the first three features, etc. Accordingly, the number of nested models 265 may be equal to the number of features in the sorted subset of features 255.

The device 205 may use these determined nested models 265 to perform a final cut 270 and select a single model to output for the linear model generation 210 procedure. For example, the output model may be an example of a non-regularized, close-to-optimum linear model 275. To select the linear model 275, the device 205 may apply a criterion to determine quality metrics for the nested models 265. In some cases, to more efficiently select a model, the device 205 may perform a "rake" technique to reduce the number of quality metrics the device 205 calculates for the nested models 265. Based on the model quality criterion (e.g., an AIC), the device 205 may select a model, such as a linear model 275, from the set of nested models 265. The selected model may contain a number of features (e.g., a further subset of the sorted subset of features 255) as predictor variables. The device 205 may store the generated linear model 275 in memory, display the linear model 275 to a user in a user interface, perform further processing on the linear model 275, perform one or more predictions using the linear model 275 and one or more sets of input variables, or perform any combination of these or other actions.

Based on the linear model generation 210 efficiently scanning the dataset for analysis (e.g., scanning the dataset twice during linear model generation 210), the device 205 may execute linear model generation with low processing, memory, and temporal overhead. Additionally, the device 205 may efficiently handle very large datasets (e.g., datasets containing millions of data records) as the number of data scans and the utilized memory resources do not scale with the number of data records. The device 205 may execute all computations during a scan in parallel, such that determining information for a number of features 215 or a number of models 265 may be performed in a single scan of the dataset. Accordingly, the linear model generation 210 may determine a linear model 275 based on very complex or massive datasets in a matter of seconds, allowing for accurate and interactive data analysis within large database systems.

In a specific example, if the device 205 analyzes a set of 10,000 features 215 (plus all two-way interactions between features 215), the device 205 may use less than half a gigabyte to determine the stump R-squared values for all of these features 215 (e.g., by reusing a 2×2 matrix for the stump R-squared computations). If, following the first cut 230, the device 205 determines a subset of 300 features 235 relevant to the linear model generation 210 procedure, the device 205 may use approximately half a megabyte to iteratively generate a 300×300 matrix to perform the priority sort 250. As such, even with large numbers of features for the linear model generation 210, the memory overhead for determining a near-optimal linear model 275 is relatively low (e.g., within the capabilities of a user device or server).

Figure 3:
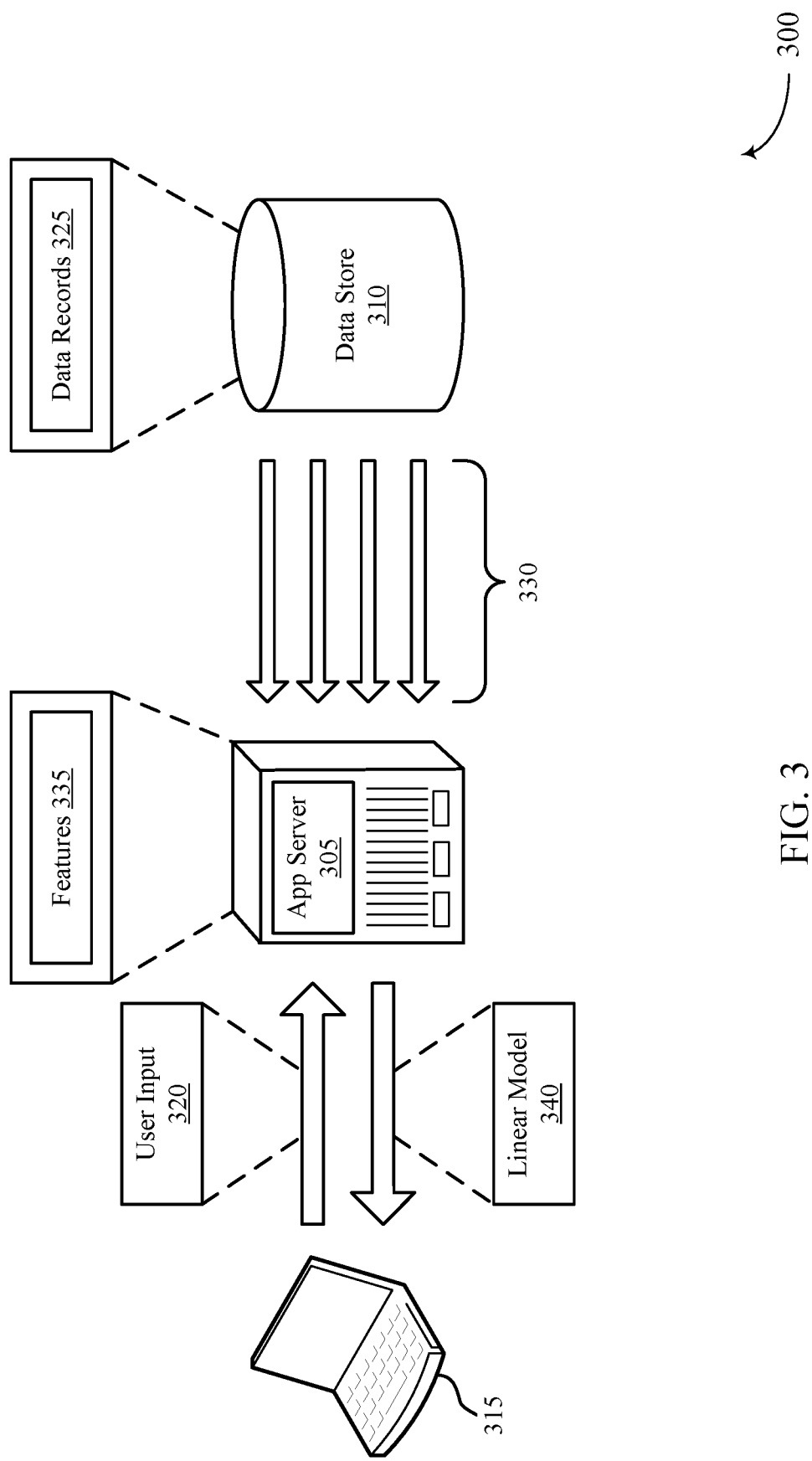
FIG. 3 illustrates an example of a system that supports automatic feature selection and model generation for linear models in accordance with aspects of the present disclosure.

FIG. 3 illustrates an example of a system 300 that supports automatic feature selection and model generation for linear models in accordance with various aspects of the present disclosure. The system 300 may include an application server 305 (e.g., a device 205 as described with reference to FIG. 2), a data store 310, and a user device 315. In some cases, the functions performed by the application server 305 may instead be performed by a component of the data store 310 or the user device 315. The user device 315 may support an application for data analytics. A user operating the user device 315 may interact with the application to create linear models 340, where the application server 305 automatically selects features 335 for the linear models 340. The user may utilize these linear models 340 to predict outcomes or learn about dependencies within datasets (i.e., sets of data records 325).

The user device 315 may display an interactive interface for data analysis. In some cases, this interface may run as a webpage within a web browser. In other cases, this interface may be part of an application downloaded onto the user device 315. A user operating the user device 315 may input information into the user interface to specify aspects of the data analysis. For example, the user may input a specific outcome variable for model generation, a set of features 335 to test, a dataset for analysis, quality metrics or feature metrics for model generation (e.g., a maximum number of features for inclusion in the linear model 340, a minimum quality metric for a linear model 340, etc.), or some combination of these. In some cases, the user may be associated with a specific dataset based on a user credential or user identifier (ID), and the data records 325 for analysis may be determined based on this associated dataset. For example, if a user is part of a specific organization, the application server 305 may perform data analytics on data records 325 for that organization. In this way, a multi-tenant database system may separate data analysis for different tenants, ensuring data security and accurate data analysis for each tenant.

Based on the user input 320, the user operating user device 315, or both, the application server 305 may retrieve or otherwise read relevant data records 325 from a data store 310. In some cases, the application server 305 may retrieve the data records 325 in batches 330 from the data store 310 (e.g., to reduce the available memory resources, such as disk memory, random-access memory (RAM), etc., needed to analyze the data records 325). The application server 305 may identify a set of features 335 for analysis based on the retrieved data records 325, the user input 320, or both. In a first example, the application server 305 may analyze any data features 335 corresponding to the retrieved data records 325. In a second example, the user input 320 may specify the features 335 for analysis. In a third example, the application server 305, the user, or both may perform iterative feature 335 reduction during a model generation procedure. For example, the application server 305 may automatically select a set of features 335 for analysis based on the data records 325, and may perform a first cut of the features 335 to determine a subset of features 335. The application server 305 may then send indications of these features 335 to the user device 315 for display in the user interface, and a user may select features to remove from this subset of features 335. This may allow a user to identify and remove endogenous features from the subset of features 335 (e.g., features that may be too dependent on the outcome of the linear model 340). Additionally, the user may remove any other features that the user does not want included in the remainder of the model generation procedure. The user device 315 may send this further subset of features 335 back to the application server 305 for continued processing.

Based on the features 335 (e.g., the initially identified features 335, an automatically determined subset of the features 335, a user-selected subset of the features 335, or some combination of these), the application server 335 may generate a model, such as a linear model 340. In some cases, the application server 305 may store the linear model 340 in memory. Additionally or alternatively, the application server 305 may send the linear model 340 to the user device 315 for display or to the data store 310 for persistent or long-term storage. If the user device 315 receives the linear model 340, the user device 340 may display the linear model 340 or the corresponding relevant features in the user interface. In some cases, the user or other processes may input values into the linear model 340 to determine predicted outcomes based on the generated linear model 340. In some examples, the user may modify the linear model 340 in the user interface of the user device 315.

In some cases, a linear model 340 may be updated based on new or updated data records 325. In one example, a user may trigger an update for a linear model 340 (e.g., by clicking a button in the user interface or inputting updated parameters for the linear model 340). In another example, the application server 305 may automatically update the linear model 340 based on a trigger (e.g., a periodic update trigger, a new data record 325, a set of new or updated data records 325 exceeding some threshold number of records, etc.). In these cases, the application server 305 may perform one or more steps of the model generation procedure to update the linear model 340. For example, if the application server 305 or data store 310 stores a matrix for feature regularization in memory, the application server 305 may efficiently update the linear model 340 based on new or updated data records 325 by scanning only the new or updated data records 325, and not the data records 324 previously scanned to create the matrix. Such a process may support realtime or pseudo-realtime updates of linear models 340 at the application server 305, improving the accuracy of data analytics in dynamic systems 300.

Figure 4:
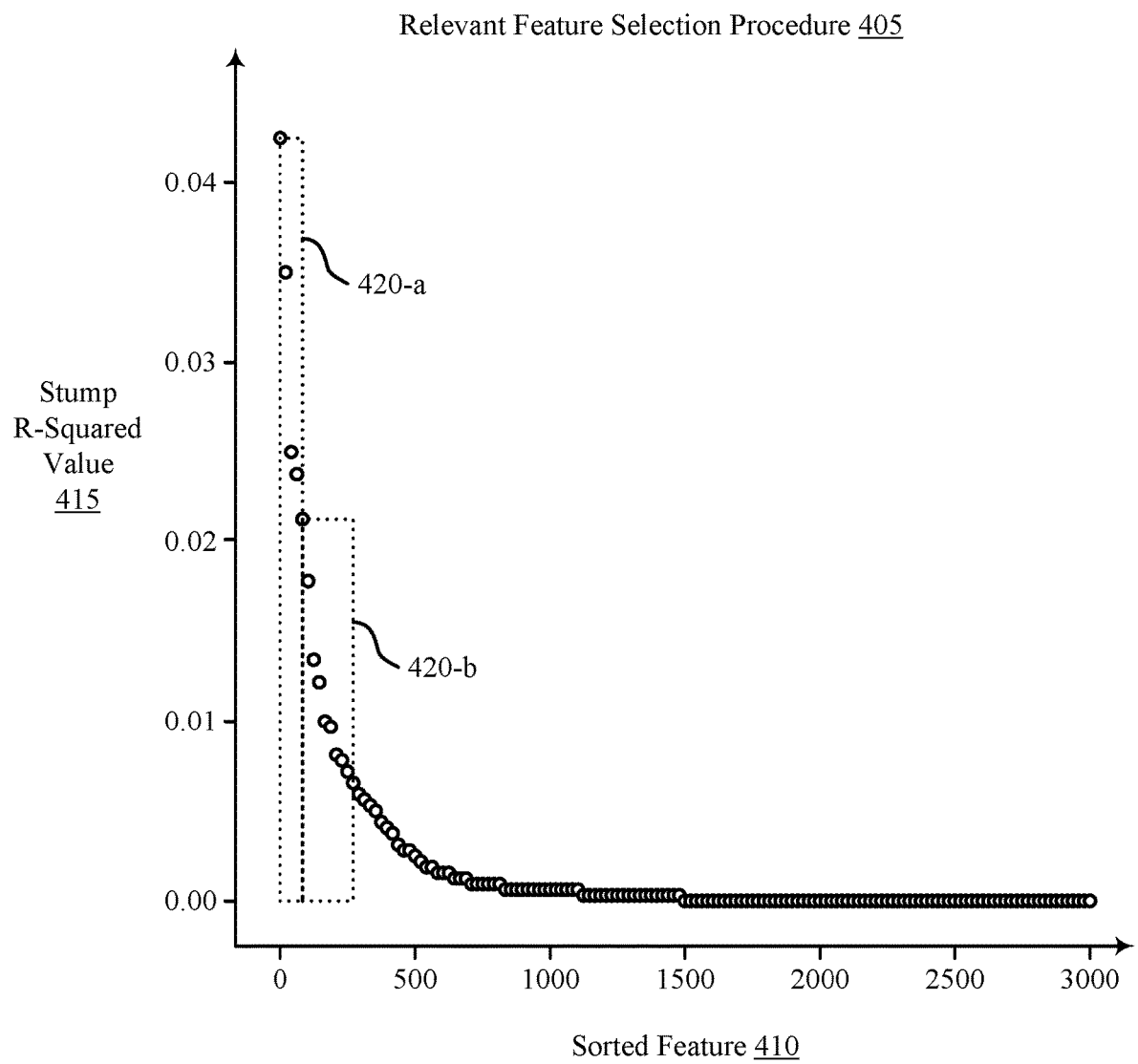
FIG. 4 illustrates an example of a double-box feature selection procedure that supports automatic feature selection and model generation for linear models in accordance with aspects of the present disclosure.

FIG. 4 illustrates an example of a double-box feature selection procedure 400 that supports automatic feature selection and model generation for linear models in accordance with various aspects of the present disclosure. The double-box feature selection procedure 400 may be performed by a device, such as a device 205, an application server 305, or any component of subsystem 125 as described with respect to FIGS. 1 through 3. The double-box feature selection procedure 400 may involve sorting a set of data features in descending order according to relevance measurements (e.g., stump R-squared values 415) and graphing the resulting data as sorted features 410 versus stump R-squared values 415. The device may use the resulting curve for a relevant feature selection procedure 405 by fitting one or more least squares boxes 420 to the curve. While the procedure is illustrated as a double-box feature selection procedure 400, it is to be understood that any number of boxes may be used for feature selection. In some cases, the device is pre-configured to use a certain number of boxes for the relevant feature selection procedure 405. In other cases, the device may dynamically select the number of boxes for the relevant feature selection procedure 405 (e.g., based on a user input, characteristics of the features or the underlying data records, etc.).

To create the sorted features 410 versus stump R-squared values 415 curve, a device may select a set of relevant features. In some cases, the device may automatically select the relevant features. In other cases, a user may specify the relevant features or may modify features automatically selected by the device. The selected relevant features may include single features, compound features (i.e., interaction features), or both. A single feature may be an example of a value for one categorical or quantitative variable (e.g., a color feature may have the value "red"). A compound feature may correspond to a second order interaction between variables or any higher order of interaction between features. One example of a compound feature may be the interaction between the color feature and a state of purchase feature, which may have the value "red-California." In some cases, the level of compound features included may be pre-configured for the device or may be dynamically determined based on a user input or the number of single features.

The device may calculate stump R-squared values 415 for the selected relevant features. To determine each stump R-squared value 415, the device may create a trial regression model using a single feature of the set of relevant features. The stump R-squared values 415 may be numerical representations of how much a specific feature explains the behavior of the specified outcome variable (e.g., generally a value between 0 and 1, where greater values indicate greater relevance to the specified outcome). Stump R-squared values 415 may be useful for linear models and fast computations. The device may calculate each stump R-squared value 415 in parallel during a single scan of the relevant data records. In some cases, this scan of the data records may involve the device reading one data record at a time into memory (e.g., RAM). Alternatively, the device may read subsets of the full dataset (e.g., where each subset contains multiple data records) into memory, where the number of data records in each subset may be based on a configuration of the device. By iteratively scanning the data records to calculate all of the stump R-squared values 415, the device may greatly reduce the memory overhead associated with the relevant feature selection procedure 405. The device may sort the features in descending order according to the resulting stump R-squared values 415. While the relevance metrics are described herein as stump R-squared values 415, it is to be understood that other relevance metrics may be used for automatic feature selection, such as the Pearson correlation, mutual information (MI), etc. In some cases, such relevance measurements may be used for generating other types of models (e.g., MI may be used for non-linear models).

The device may determine the curve based on the stored features 410 and the stump R-squared values 415. This resulting curve may take the form of a power law $y=Cx^{-\alpha}$ as illustrated in FIG. 4, where C is some constant and $-\alpha$ is some exponent. The device may select the most relevant features based on this curve and one or more least squares regression procedures. For example, in a double box feature selection procedure, the device may perform a first least squares regression to fit a first box 420-$a$ to the curve. This first box may include a number of features from the list of sorted features 410 (e.g., the first n features from the set of sorted features 410). The device may then perform a second least squares procedure to fit a second box 420-$b$ to the curve. This second least squares procedure may be based on the remaining features in the set of sorted features 410 not including the n features contained in the first box 420-$a$. The second box 420-$b$ may contain the next m features from the set of sorted features 410. Accordingly, based on the double box feature selection procedure, the device may select the first n+m features from the set of sorted features 410 in a first cut. The set of relevant features following this first cut may be below some threshold number of features (e.g., 200) due to the number of boxes used and the power law relationship.

The features resulting from this first cut may be used as a base set of features for further processing by the device. In some cases, this set of features may still include redundant features, which may result in instabilities for a linear model (e.g., large variations in coefficient estimates with small changes in a training set of data). The device may perform further processes (e.g., LASSO regression) to filter out such redundant features. Additionally or alternatively, a user may modify the set of features before or after this first cut to filter out features which are endogenous to the outcome. The resulting subset of features may be passed on to a component for feature regularization and sorting.

Figure 5:
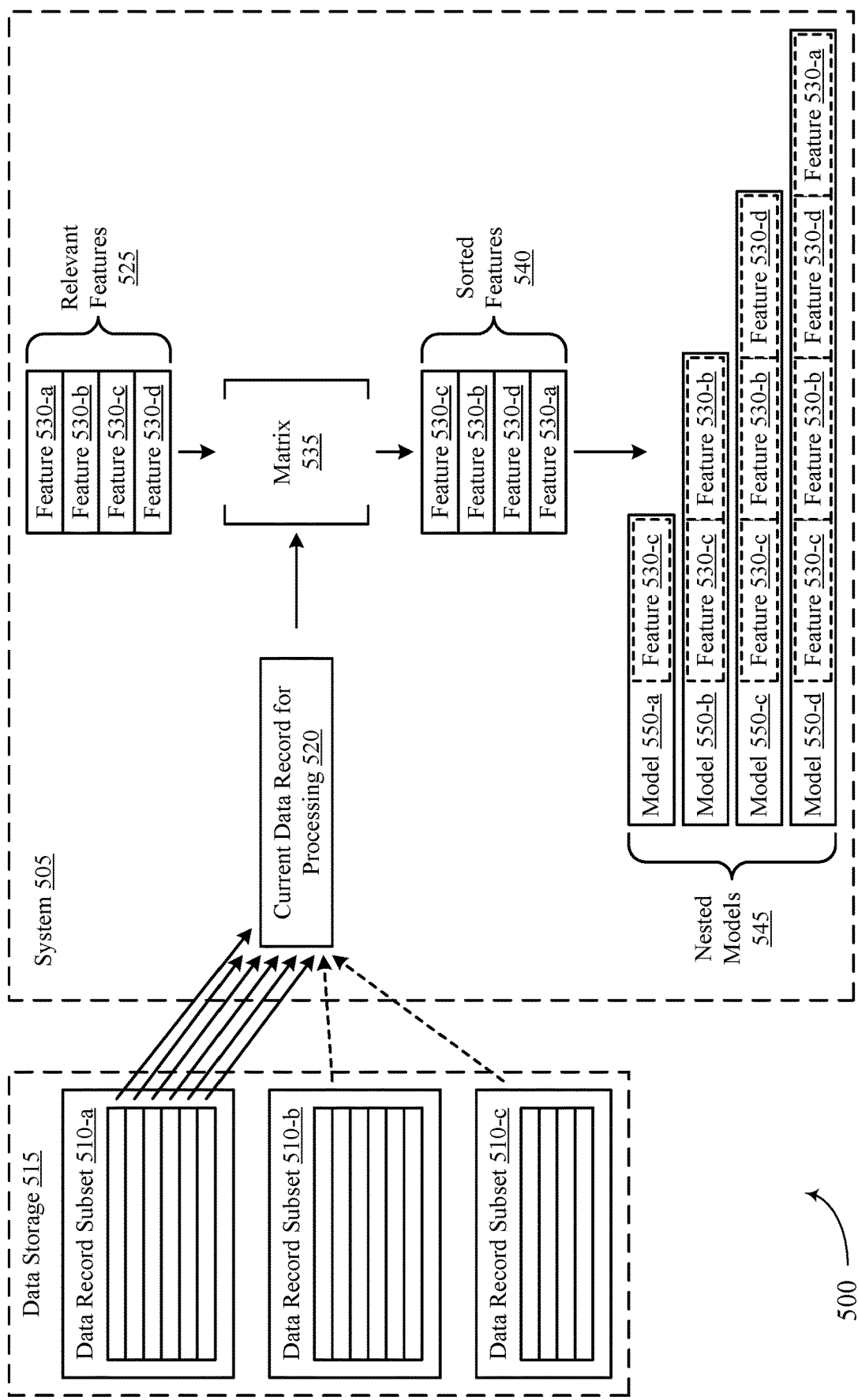
FIG. 5 illustrates an example of an iterative matrix generation process that supports automatic feature selection and model generation for linear models in accordance with aspects of the present disclosure.

FIG. 5 illustrates an example of an iterative matrix generation process 500 that supports automatic feature selection and model generation for linear models in accordance with various aspects of the present disclosure. The iterative matrix generation process 500 may be performed by a system 505, which may be a component of a device such as a device 205, an application server 305, or any component of subsystem 125 as described with reference to FIGS. 1 through 3. The iterative matrix generation process 500 may support generating a matrix 535 based on an underlying dataset and using the matrix 535 to sort a set of relevant features 525 based on a series of L1 regularizations (e.g., using a LASSO regression procedure). This set of relevant features 525 may be determined according to a relevant feature selection procedure 405, as described with respect to FIG. 4. By performing the iterative matrix generation process 500, the system 505 may efficiently handle large datasets (i.e., sets of data records) without incurring a large processing or memory overhead.

The system 505 may receive a base set of relevant features 525 (e.g., selected in a first cut process) and may perform a priority sort on the relevant features 525. To perform the priority sort, the system 505 iteratively generates a matrix 535. This matrix 535 may be an example of a symmetric matrix, where the dimensions of the matrix 535 are based on (e.g., equal to) the number of features 530 in the set of relevant features 525. Iteratively generating the matrix 535 involves performing a version of a LASSO regression procedure on a dataset without storing the dataset in memory. That is, the system 505 may build the mathematical structures used in the priority sort (e.g., the matrix 535) on the fly as the data records are read "out-of-core." For example, the system 505 may read each data record one-by-one from data storage 515 and may update a matrix 535 based on the current data record for processing 520. In this way, the system 505 may generate a matrix 535 based on an entire dataset without the dataset ever being memory-resident at the device performing the iterative matrix generation process 500. Such a process reduces the memory overhead associated with linear model generation.

The current data records for processing 520 may be read one at a time or in small batches from data storage 515, which may be on disk at the device performing the iterative matrix generation process 500 or may be an external database system. In some cases, if the data records are retrieved from disk, the disk may store data record subsets 510 retrieved from a database or data store. For example, the device may store a first data record subset 510-$a$ on disk at a first time. Once the system 505 scans all of the data records in the first data record subset 510-$a$ and updates the matrix 535 based on these data records, the device may replace the first data record subset 510-$a$ with a second data record subset 510-*b*. This process may continue until a last data record subset 510 (e.g., data records subset 510-*c*) is retrieved for data storage 515 and scanned for matrix generation. In this way, the underlying dataset size does not limit the iterative matrix generation process 500.

Once the matrix 535 is generated, the system 505 may use the matrix 535 to perform a series of L1 regularizations on the relevant features 525 with a continuously increasing stress parameter. As the stress parameter (i.e., a penalty value A) increases, feature coefficients (i.e., LASSO coefficients) for the relevant features 525 are forced to zero to support the stress parameter. This LASSO procedure may be an example of a competitive ordering of terms based on the penalty value. The system 505 may sort the relevant features 525 according to the order that the feature coefficients reach zero. For example, the first feature coefficient to go to zero based on the continuously increasing penalty value corresponds to the feature 530 (e.g., feature 530-*a*) with the lowest priority, while the last feature coefficient to go to zero corresponds to the feature 530 (e.g., feature 530-*c*) with the highest priority. The system 505 may sort the features 530 into a set of sorted features 540 according to the determined priorities (e.g., as illustrated, with feature 530-*c* first, feature 530-*b* second, feature 530-*d* third, and feature 530-*a* fourth).

Using the sorted features 540, the system 505 may identify a set of nested models 545. Each successive model 550 of the set of nested models 545 may include one additional feature 530 of the set of sorted features 540. For example, a first model 550-*a* of the set of nested models 545 may be based on the highest priority feature 530-*c* according to the sorted order of the features 530. The second model 550-*b* may be based on this highest priority feature 530-*c* and the next highest priority feature 530-*b*, the third model 550-*c* may be based on the three highest priority features 530-*c*, 530-*b*, and 530-*d*, and the fourth model 550-*d* may be based on all of the features 530 in the set of sorted features 540. Accordingly, the system 505 may identify a number of nested models 545 equal to the number of features 530 in the base set of features (i.e., the set of relevant features 525). The system 505 may send the identified nested models 545 for further processing to determine a single model 550 from the set of nested models 545. For example, a single "best" model 550 may be selected from the nested models 545 based on model quality criteria for the nested models 545, where the selected model 550 is generated as the output of the model generation procedure.

By sorting the relevant features 525 according to L1 regularizations, the system 505 may reduce the redundancies between features 530 in the final model 550. For example, certain features 530 may be very relevant to the outcome variable, but the relevancy may overlap with other features 530. For correlated variables such as these, a LASSO regression may select one and filter out the other variables. For example, a "price" feature and a "sales tax" feature may both be very relevant to the expected profits for a certain item, but the relevancy of these features may overlap significantly. While a measure of relevance may prioritize both of these features, a LASSO regression procedure based on both relevance and feature overlap may prioritize one of these features (e.g., the "price" feature) but not the other. As such, the L1 regularizations may minimize feature redundancy between features 530 sorted to the top of a priority queue, which may enhance model building. For example, due to sorting based on LASSO regression, the features 530 in each model 550 of the set of nested models 545 limit redundancy, creating a maximally predictive combination of features 530.

Some systems may select a linear model based on selecting a specific value for the stress parameter in a LASSO regression procedure. For example, a system may perform an optimal cross-validation procedure to select a penalty parameter and may generate a linear model that includes the features that have not been forced to zero for that penalty parameter. However, such a regularized model may be difficult for a user to interpret, because the regularized model can diffuse the contribution of important influencers (e.g., features)—making these influencers difficult to identify— and can distort graphs (e.g., waterfall graphs) displaying outcome drivers. Instead, the system 505 may use LASSO regression for a feature 530 sort, as the order in which features 530 drop out due to the continuously increasing penalty parameter may define an order for including features 530 in model building. A final regression model 550 may then be selected, not based on a specific penalty parameter, but based on calculated model quality metrics. Furthermore, some systems may use other feature selection or ordering procedures, such as simulated annealing, branch-and-bound processes, genetic algorithms, etc. However, such procedures may result in a large processing or memory overhead (e.g., due to the procedures using memory-resident data records for processing) as compared to LASSO regression.

Figure 6:
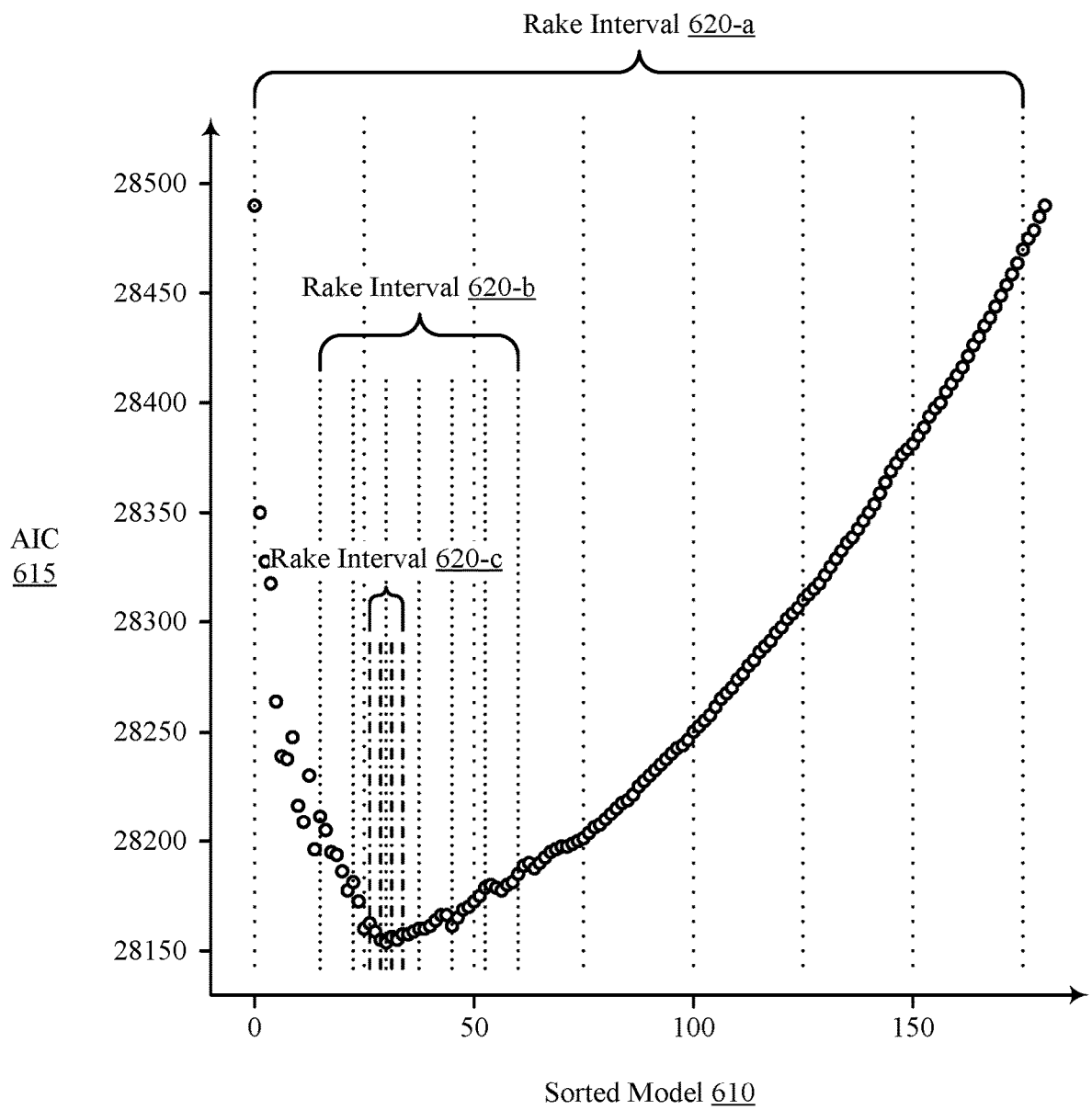
FIG. 6 illustrates an example of a rake technique that supports automatic feature selection and model generation for linear models in accordance with aspects of the present disclosure.

FIG. 6 illustrates an example of a rake technique 600 that supports automatic feature selection and model generation for linear models in accordance with various aspects of the present disclosure. The rake technique 600 may be performed by a device, such as a device 205, an application server 305, a system 505, or any component of subsystem 125 as described with respect to FIGS. 1 through 3 and 5. The rake technique 600 may be an example of a model selection procedure 605, where one model is selected from a set of possible models according to some model quality criteria. In some case, the model selection procedure 605 may be referred to as a final cut, where a set of relevant features is reduced to the set of features corresponding to the selected final model for generation. The set of models for analysis may be an example of a set of nested linear models (e.g., identified based on the iterative matrix generation process 500 described with reference to FIG. 5). To evaluate the models, a device may use a model quality criterion, such as AIC, AIC with a correction for small sample sizes (AICc), adjusted R-squared, Mallows's $C_p$, Bayesian information criterion (BIC), Hannan-Quinn information criterion (HQIC), minimum description length (MDL), standard error of regression, etc. For example, the device may use AIC 615 (or AICc) to balance feature contribution and inclusiveness in the model selected.

A device may use a rake optimizer to efficiently compute the AICs for models, reducing the time latency, processing overhead, and memory overhead involved in selecting a model. By improving the model generation efficiency, a data analytics application may perform model generation on a time scale of milliseconds, seconds, or minutes, supporting user interaction throughout the data analysis process. For example, if a device attempts to compute the AIC 615 for every model 610 in a set of nested models (e.g., where the number of models 610 is equal to the number of features selected in a relevant feature selection procedure 405 as described with reference to FIG. 4), the device may perform an exhaustive computation that could take multiple hours to complete (e.g., for a couple hundred features in a complicated dataset). This exhaustive computation may involve the device performing a number of matrix inversions equal to the number of models 610 multiplied by a number of computations (or folds, such as ten in the case of a 10-fold computation) for averaging and/or cross-validating the AIC 615. These matrix inversions may be extremely expensive in terms of processing overhead and latency.

The rake technique 600 may take advantage of the shape of the model 610 versus AIC 615 curve (e.g., where each successive model 610 includes a single additional feature compared to the previous model 610). This curve may be broadly convex (albeit with some jitter in the data points) as illustrated by example in FIG. 6. Traditional optimizers may not accurately determine the minimum AIC 615 for a model 610 without calculating each AIC 615 value. Instead, a device may use the rake technique 600 for the model selection procedure 605, where the rake technique 600 evaluates a subset of the models (e.g., approximately 10% of the models) in order to determine the minimum AIC 615.

In a first iteration of the rake sampling procedure, the device may sample the set of sorted models 610 according to a first rake interval 620-a. This first rake interval 620-a may include an equal interval between sampling points, and the size of the interval may be based on the number of models 610, a percentage of the models 610 to sample during the rake procedure, or a combination thereof. The device may determine the minimum AIC 615 calculated for the sampling points (i.e., the "rake spokes") for this first rake interval 620-a and may discard (i.e., remove from analysis and possible selection) models 610 belonging to rake regions far from the model with the minimum AIC 615. Then, the device may perform a second iteration of the rake sampling procedure on the remaining (i.e., coalesced) region using a second rake interval 620-b, where the second rake interval 620-b has a smaller sampling interval than the first rake interval 620-a. The device may then determine the minimum AIC 615 for this second rake interval 620-b. In some cases, the device may store prior AIC computations (e.g., all of the prior AIC values or the minimum prior AIC value), and may further compare the AIC values for each rake interval 620 with the previously calculated AIC values to determine the minimum AIC 615. These previous AIC computations may also be used if rake spokes coincide for different rake intervals 620.

Once a rake interval 620 is contracted such that the sampled models 610 are consecutive (e.g., rake interval 620-c, where the spokes of the rake correspond to a set of contiguous models in the set of sorted models 610), the device may determine the minimum AIC 615 and select the corresponding model 610 as the optimum model according to the rake optimizer. The model generation procedure may output the selected model 610 as the "best" model. Using the rake optimizer, the device may reduce the processing resources and time needed to select a model with a minimum AIC 615 from a large set of sorted models 610 (e.g., over one hundred sorted models 610).

In some cases, a user may specify one or more of the parameters for rake optimization. For example, the user may specify a number of samples per rake interval 620, a sampling interval width for one or more of the rake intervals 620, a number of rake iterations to perform, a model reduction factor for each iteration (e.g., specifying a percentage of models 610 to remove at each iteration), a feature range for a reduced range of models 610 (e.g., if a model 610 with 35 features corresponds to the minimum AIC 615 at a step of the rake technique 600 with a feature range of 10, the device may reduce the range for analysis to the interval from the model 610 with 25 features to the model 610 with 45 features), or some combination of these. In other cases, one or more of these parameters are pre-configured or dynamically determined by the device.

Figure 7:
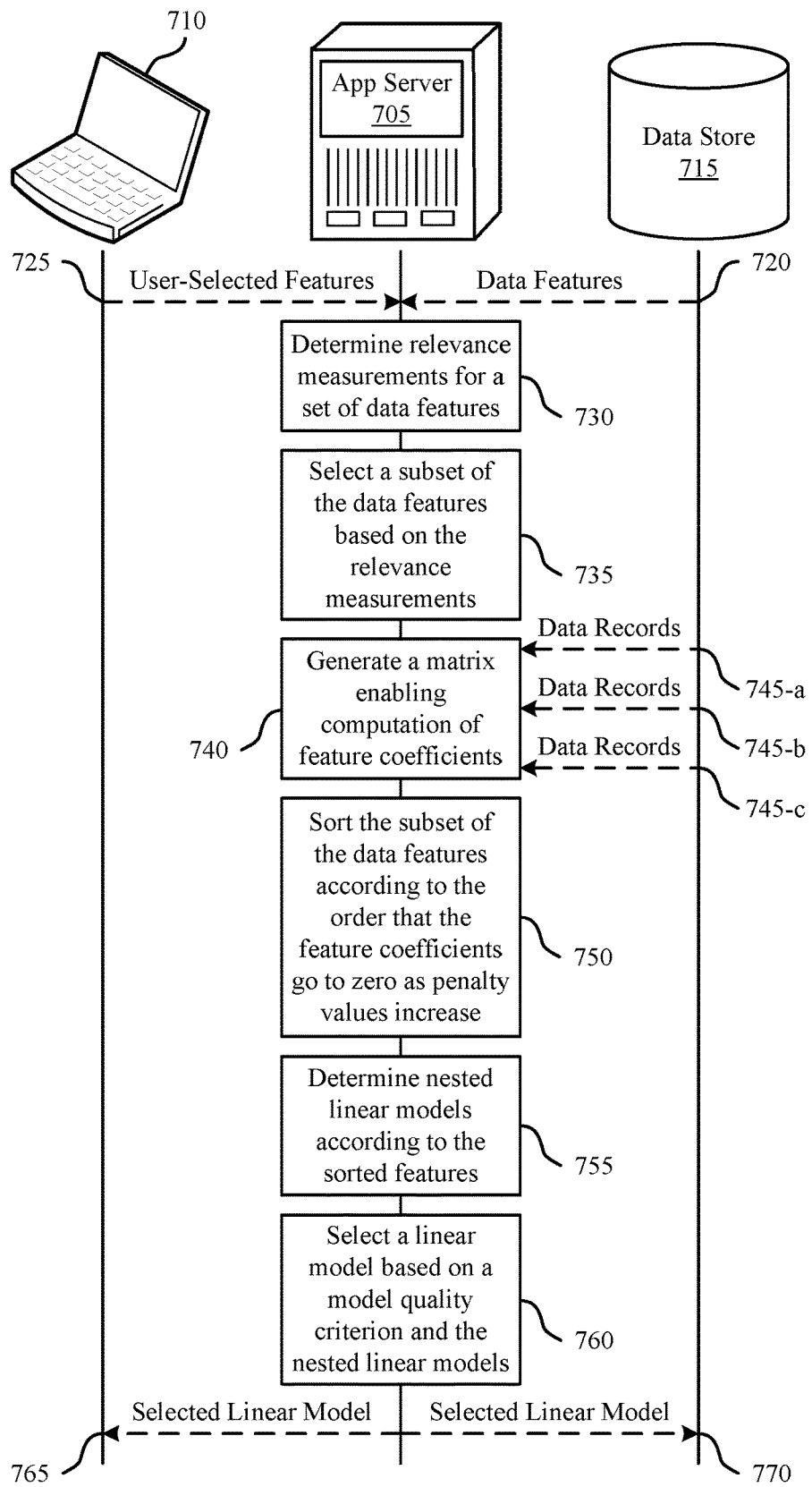
FIG. 7 illustrates an example of a process flow that supports automatic feature selection and model generation for linear models in accordance with aspects of the present disclosure.

FIG. 7 illustrates an example of a process flow 700 that supports automatic feature selection and model generation for linear models in accordance with various aspects of the present disclosure. The process flow 700 may involve an application server 705 or some other device for linear model generation, a user device 710, and a data store 715, which may be examples of the corresponding devices described with reference to FIGS. 1 through 6. In some cases, some or all of the functionality of the application server 705 may be performed by components of the user device 710 or the data store 715. The application server 705 may implement a number of techniques to select a linear model in a linear model generation process. Alternative examples of the following may be implemented, where some steps are performed in a different order than described or are not performed at all. In some cases, steps may include additional features not mentioned below, or further steps may be added.

The application server 705 may identify a set of data features related to a dataset (e.g., a set of data records stored in the data store 715). These data features may include single features, compound features (e.g., features with higher order interactions between terms), or both. In some cases, at 720, the application server 705 may identify the features based on retrieving the set of data records from the data store 715. Additionally or alternatively, at 725, the user device 710 may receive a user input indicating a set of features for data analysis. For example, a user may specify, via a user selection, a set of features to remove from an initial set of data features for analysis. The user device 710 may transmit the set of user-selected features to the application server 705, and the application server 705 may determine an initial subset of the data features according to the set of user-selected features to remove.

At 730, the application server 705 may determine a set of relevance measurements, where each relevance measurement corresponds to a respective feature of the set of data features. In some cases, these relevance measurements may be stump R-squared values. At 735, the applications server 705 may select a subset of the set of data features based on the set of relevance measurements (e.g., in a "first cut"). To select the subset of features, the application server 705 may identify a curve corresponding to the set of relevance measurements sorted in descending order (e.g., where the curve represent the sorted features plotted against the relevance measurements) and may select the subset of features based on a shape of the curve. For example, the number of selected features may be based on an area under the curve, an initial slope of the curve (e.g., a steeper initial slope may correspond to a wider range in relevance for the more relevant features), or both. In some cases, the applications server 705 may select the subset of features by fitting one or more (e.g., two) boxes to the curve based on a least squares analysis, where the features contained within any of the boxes correspond to the selected features for the subset.

At 740, the application server 705 may generate a matrix based on the selected subset of data features. This matrix may enable computation of feature coefficients for the selected features based on an increasing penalty value. For example, the application server 705 may generate the matrix using an iterative scanning process. The application server 705 may retrieve data records from the data store 715 in batches (e.g., the applications server 705 may receive a first batch of data records at 745-a, a second batch of data records at 745-b, and a third batch of data records at 745-c). The application server 705 may generate the matrix using a single scan of the data records. The application server 705 may process one data record at a time (e.g., only reading a single data record for processing at any moment in time) or a set of data records at a time (e.g., reading a limited subset of data records for processing at any moment in time) to limit the memory overhead associated with the matrix generation process. Using this matrix, the applications server 705 may perform a LASSO regression procedure. The LASSO regression procedure may involve using the matrix to assign a feature coefficient to each feature of the subset of data features and continually increasing a penalty value until all of the feature coefficient reach zero (i.e., are set to zero to support the penalty value). At 750, the application server 705 may sort the selected subset of data features according to the order that the feature coefficients are set to zero (i.e., go to zero) as the penalty value increases. For example, the first feature in the sorted subset of features may correspond to the feature coefficient that goes to zero last (e.g., the feature that is most relevant to the specified outcome for the linear model).

At 755, the application server 705 may determine a set of nested linear models according to the sorted subset of data features. For example, each successive model in the set of nested linear models may include an additional feature of the sorted subset of features. That is, the first nested model may include a single feature (i.e., the most relevant feature as determined by the LASSO regression procedure), the second nested model may include two features (i.e., the most relevant feature and the second most relevant feature), etc.

At 760, the application server 705 may select a linear model from the set of nested linear models based on a model quality criterion (e.g., an AIC). In one specific example, the application server 705 may perform a "rake" technique to select the linear model. The rake technique may involve the application server 705 determining model quality criterion values for a subset of the nested linear models according to a first sampling interval, identifying the "best" (e.g., minimum) determined model quality criterion value and the corresponding model, and narrowing the set of nested linear models down to a subset of models corresponding to a region around the model with the minimum value. The size of the reduced region may be based on one or more threshold values, such as a model reduction factor for the rake sampling procedure (e.g., specifying how many models to remove at each step in the rake technique), a feature range for the subset of nested linear models (e.g., specifying a width of the region around the linear model with the minimum model quality criterion value), or any other relevant threshold values. The application server 705 may repeat the rake technique within the determined region using a smaller sampling interval. In some cases, the application server 705 may also store, in memory, the minimum value determined from previous steps of the rake procedure. At each step, the application server 705 may further refine the region for analysis until the region is small enough such that the sampling interval includes every model remaining in the region. The application server 705 may then select the linear model with the lowest model quality criterion value (e.g., AIC value) remaining in the region. The applications server 705 may generate this linear model based on the automatic feature selection and model generation procedure.

In some cases, at 765, the application server 705 may send (e.g., transmit) the selected linear model to a user device 710 for further processing or display. For example, the user device 710 may display the linear model in a user interface or may display the features included in the selected linear model in a user interface. A user operating the user device 710 may use the selected linear model for predicting how different features will affect the outcome variable of the linear model. In some cases, the user may further modify the selected linear model in the user interface. Additionally or alternatively, at 770, the applications server 705 may send the selected linear model to the data store 715 for persistent storage.

Figure 8:
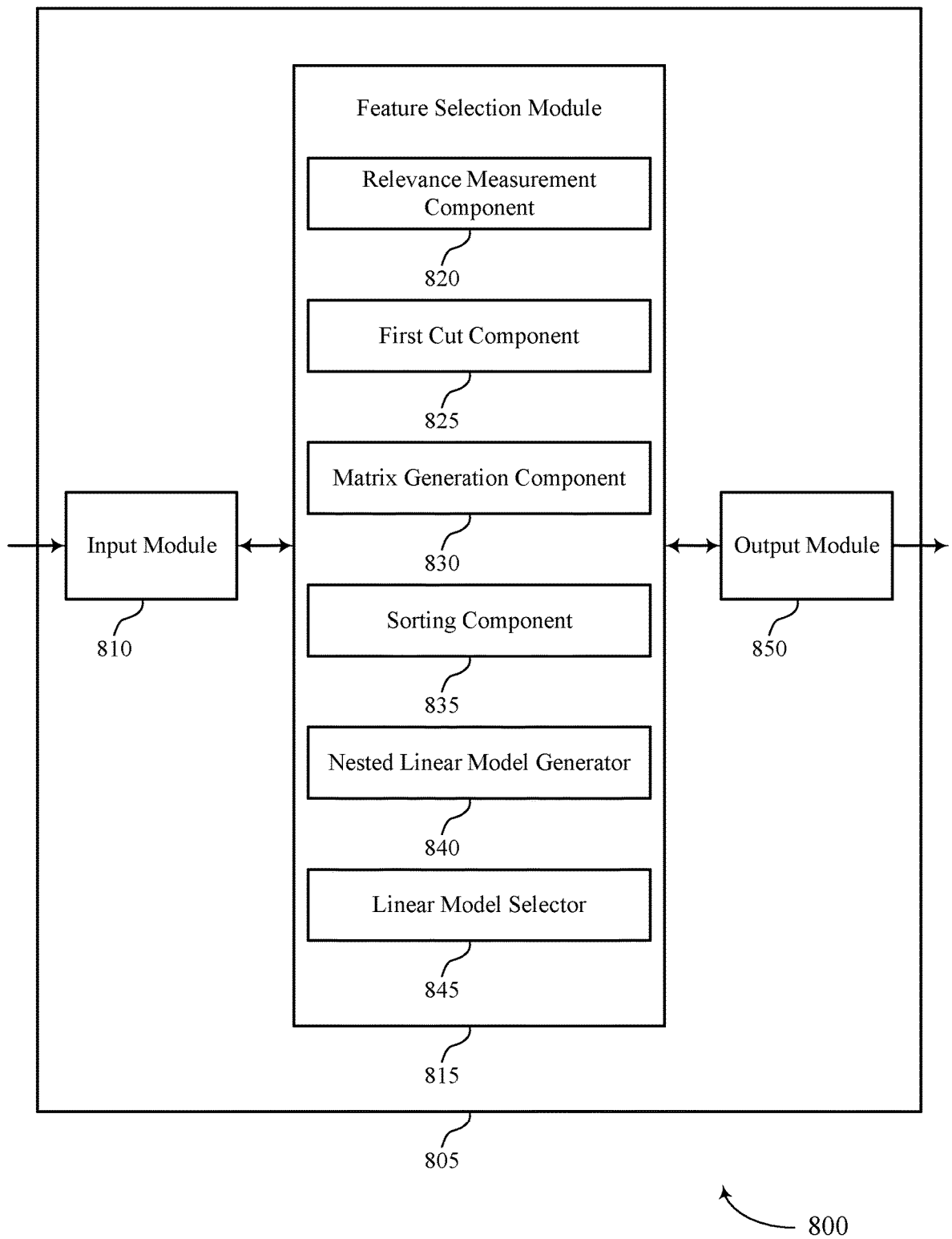
FIG. 8 shows a block diagram of an apparatus that supports automatic feature selection and model generation for linear models in accordance with aspects of the present disclosure.

FIG. 8 shows a block diagram 800 of an apparatus 805 that supports automatic feature selection and model generation for linear models in accordance with aspects of the present disclosure. The apparatus 805 may include an input module 810, a feature selection module 815, and an output module 850. The apparatus 805 may also include a processor. Each of these components may be in communication with one another (e.g., via one or more buses). In some cases, the apparatus 805 may be an example of a user terminal, a database server, or a system containing multiple computing devices.

The input module 810 may manage input signals for the apparatus 805. For example, the input module 810 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 810 may send aspects of these input signals to other components of the apparatus 805 for processing. For example, the input module 810 may transmit input signals to the data retention module 815 to support data retention handling for data object stores. In some cases, the input module 810 may be a component of an input/output (I/O) controller 1015 as described with reference to FIG. 10.

The feature selection module 815 may include a relevance measurement component 820, a first cut component 825, a matrix generation component 830, a sorting component 835, a nested linear model generator 840, and a linear model selector 845. The feature selection module 815 may be an example of aspects of the feature selection module 905 or 1010 described with reference to FIGS. 9 and 10.

The feature selection module 815 and/or at least some of its various sub-components may be implemented in hardware, software executed by a processor, firmware, or any combination thereof. If implemented in software executed by a processor, the functions of the feature selection module 815 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The feature selection module 815 and/or at least some of its various sub-components may be physically located at various positions, including being distributed such that portions of functions are implemented at different physical locations by one or more physical devices. In some examples, the feature selection module 815 and/or at least some of its various sub-components may be a separate and distinct component in accordance with various aspects of the present disclosure. In other examples, the feature selection module 815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The relevance measurement component 820 may determine, for a set of data features related to a set of data records, a set of relevance measurements, where each relevance measurement of the set of relevance measurements corresponds to a respective feature of the set of data features. The first cut component 825 may select a subset of the set of data features based on the set of relevance measurements.

The matrix generation component 830 may generate a matrix based on the selected subset of the set of data features, where generating the matrix includes iteratively scanning the set of data records, and where the matrix enables computation of feature coefficients for the selected subset of the set of data features based on an increasing penalty value. The sorting component 835 may sort the selected subset of the set of data features according to an order that the feature coefficients are set to zero as the penalty value increases.

The nested linear model generator 840 may determine a set of nested linear models according to the sorting. The linear model selector 845 may select a linear model of the set of nested linear models based on a model quality criterion and the set of nested linear models.

The output module 850 may manage output signals for the apparatus 805. For example, the output module 850 may receive signals from other components of the apparatus 805, such as the data retention module 815, and may transmit these signals to other components or devices. In some specific examples, the output module 850 may transmit output signals for display in a user interface, for storage in a database or data store, for further processing at a server or server cluster, or for any other processes at any number of devices or systems. In some cases, the output module 850 may be a component of an I/O controller 1015 as described with reference to FIG. 10.

Figure 9:
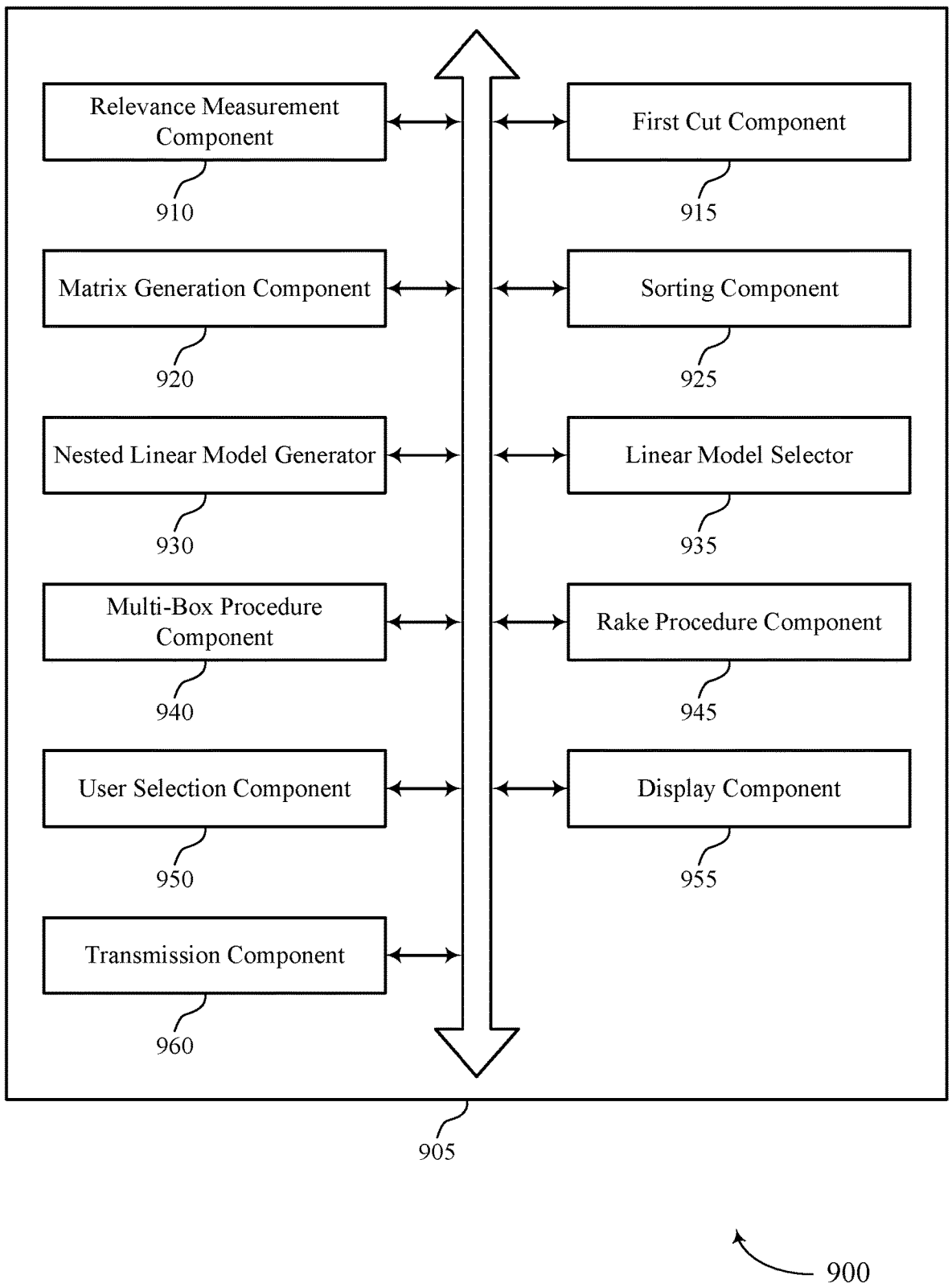
FIG. 9 shows a block diagram of a feature selection module that supports automatic feature selection and model generation for linear models in accordance with aspects of the present disclosure.

FIG. 9 shows a block diagram 900 of a feature selection module 905 that supports automatic feature selection and model generation for linear models in accordance with aspects of the present disclosure. The feature selection module 905 may be an example of aspects of a feature selection module 815 or a feature selection module 1010 described herein. The feature selection module 905 may include a relevance measurement component 910, a first cut component 915, a matrix generation component 920, a sorting component 925, a nested linear model generator 930, a linear model selector 935, a multi-box procedure component 940, a rake procedure component 945, an user selection component 950, a display component 955, and a transmission component 960. Each of these modules may communicate, directly or indirectly, with one another (e.g., via one or more buses).

The relevance measurement component 910 may determine, for a set of data features related to a set of data records, a set of relevance measurements, where each relevance measurement of the set of relevance measurements corresponds to a respective feature of the set of data features. In some cases, the set of data features includes single features, compound features, or a combination thereof. In some cases, the set of relevance measurements includes a set of stump R-squared values.

The first cut component 915 may select a subset of the set of data features based on the set of relevance measurements.

The matrix generation component 920 may generate a matrix based on the selected subset of the set of data features, where generating the matrix includes iteratively scanning the set of data records, and where the matrix enables computation of feature coefficients for the selected subset of the set of data features based on an increasing penalty value. In some examples, the matrix generation component 920 may perform batch processing on the set of data records stored in a database to generate the matrix.

In some examples, generating the matrix may involve the matrix generation component 920 reading a first subset of the set of data records and performing a first matrix building procedure using the first subset of the set of data records. In some examples, generating the matrix may further involve the matrix generation component 920 reading a second subset of the set of data records and performing a second matrix building procedure using the second subset of the set of data records, where the matrix is generated based on the first matrix building procedure and the second matrix building procedure. In some cases, the first subset of the set of data records and the second subset of the set of data records each include a respective single data record.

The sorting component 925 may sort the selected subset of the set of data features according to an order that the feature coefficients are set to zero as the penalty value increases. In some examples, the matrix generation and feature sorting procedures may involve a LASSO regression procedure.

The nested linear model generator 930 may determine a set of nested linear models according to the sorting. The linear model selector 935 may select a linear model of the set of nested linear models based on a model quality criterion and the set of nested linear models. In some cases, the model quality criterion is an AIC. In some examples, selecting the linear model involves two passes through the set of data records.

The multi-box procedure component 940 may identify a curve corresponding to the set of relevance measurements sorted in descending order, where selecting the subset of the set of data features is further based on a shape of the curve. In some examples, the multi-box procedure component 940 may fit one or more boxes to the curve based on a least squares analysis, where features contained within the one or more boxes correspond to the subset of the set of data features.

In some cases, selecting the linear model may involve the rake procedure component 945 determining a first set of model quality criterion values for the set of nested linear models according to a first sampling interval, where a number of values in the first set of model quality criterion values is less than a number of models in the set of nested linear models. The rake procedure component 945 may identify a model of the set of nested linear models corresponding to a minimum value of the first set of model quality criterion values and may determine a subset of the set of nested linear models based on the identified model and a threshold value, where the subset of the set of nested linear models includes the selected linear model. In some cases, the threshold value is an example of a model reduction factor for a rake sampling procedure, a feature range for the subset of the set of nested linear models, or a combination thereof.

In some examples, the rake procedure component 945 may determine a second set of model quality criterion values for the subset of the set of nested linear models according to a second sampling interval, where a number of values in the second set of model quality criterion values is less than a number of models in the subset of the set of nested linear models. The rake procedure component 945 may identify an additional model corresponding to a minimum value of the second set of model quality criterion values or the minimum value of the first set of model quality criterion values and may determine a further subset of the subset of the set of nested linear models based on the identified additional model and an additional threshold value, where the further subset of the subset of the set of nested linear models includes the selected linear model.

In some examples, the rake procedure component 945 may identify that a sampling interval for a set of nested linear models corresponds to each model of the set of nested linear models. In these examples, the rake procedure component 945 may determine model quality criterion values for the set of nested linear models and may determine a minimum value of the model quality criterion values for the set of nested linear models, where the minimum value of the model quality criterion values for the set of nested linear models corresponds to the selected linear model.

The user selection component 950 may receive, based on a user input, a set of user-selected features to remove from the set of data features. In some examples, the user selection component 950 may determine an initial subset of the set of data features according to the set of user-selected features to remove, where the subset of the set of data features is selected from the initial subset of the set of data features.

The display component 955 may display the selected linear model, an indication of data features corresponding to the selected linear model, or both in a user interface. The transmission component 960 may transmit, to a database, a user device, or a combination thereof, the selected linear model, an indication of data features corresponding to the selected linear model, or both.

Figure 10:
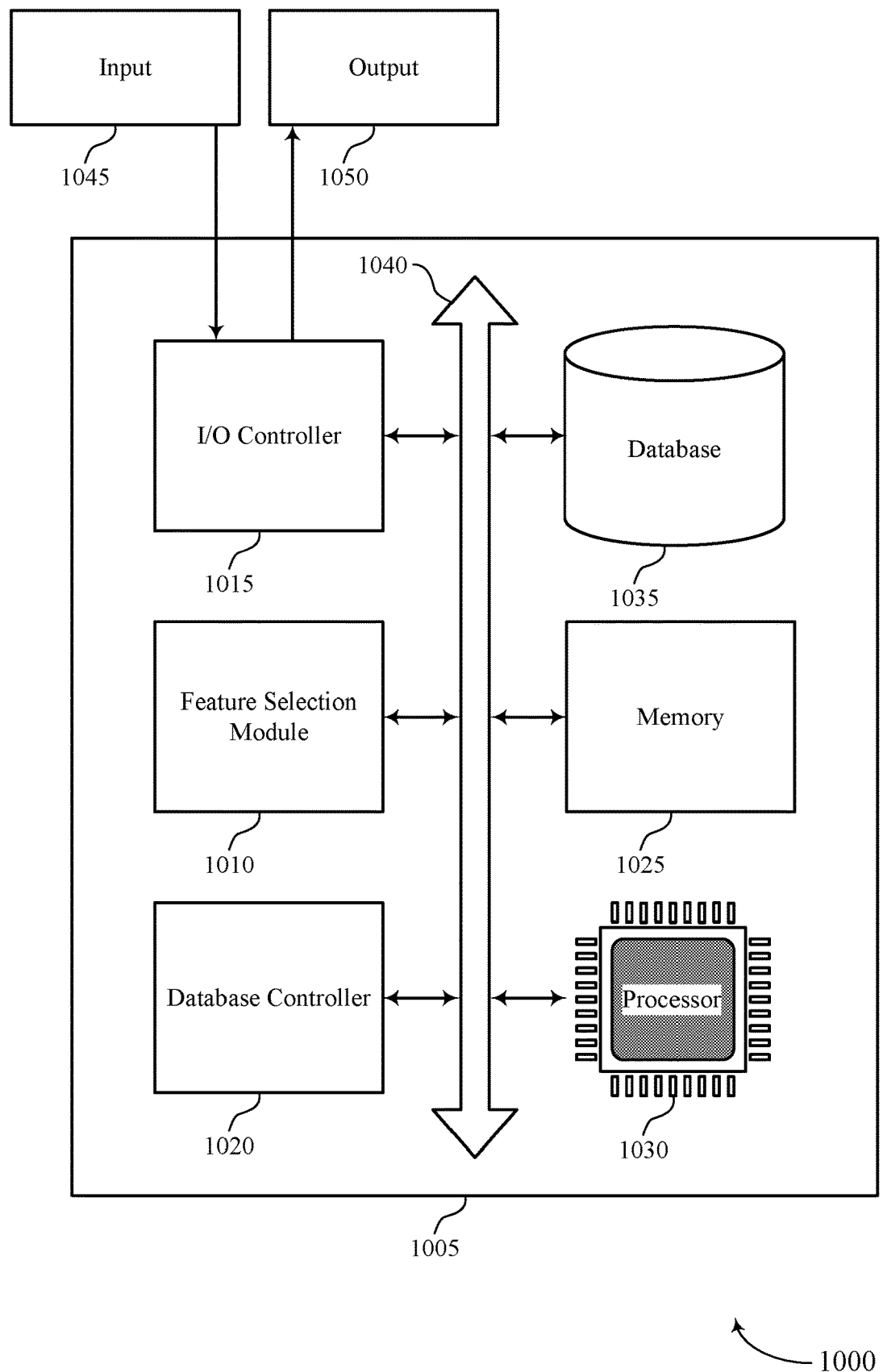
FIG. 10 shows a diagram of a system including a device that supports automatic feature selection and model generation for linear models in accordance with aspects of the present disclosure.

FIG. 10 shows a diagram of a system 1000 including a device 1005 that supports automatic feature selection and model generation for linear models in accordance with aspects of the present disclosure. The device 1005 may be an example of or include the components of a server, such as an application server, or an apparatus 805 as described herein. The device 1005 may include components for bi-directional data communications including components for transmitting and receiving communications, including a feature selection module 1010, an I/O controller 1015, a database controller 1020, memory 1025, a processor 1030, and a database 1035. These components may be in electronic communication via one or more buses (e.g., bus 1040).

The feature selection module 1010 may be an example of a feature selection module 815 or 905 as described herein. For example, the feature selection module 1010 may perform any of the methods or processes described above with reference to FIGS. 8 and 9. In some cases, the feature selection module 1010 may be implemented in hardware, software executed by a processor, firmware, or any combination thereof.

The I/O controller 1015 may manage input signals 1045 and output signals 1050 for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The database controller 1020 may manage data storage and processing in a database 1035. In some cases, a user may interact with the database controller 1020. In other cases, the database controller 1020 may operate automatically without user interaction. The database 1035 may be an example of a single database, a distributed database, multiple distributed databases, a data store, a data lake, or an emergency backup database.

Memory 1025 may include random-access memory (RAM) and read-only memory (ROM). The memory 1025 may store computer-readable, computer-executable software including instructions that, when executed, cause the processor to perform various functions described herein. In some cases, the memory 1025 may contain, among other things, a basic input/output system (BIOS) which may control basic hardware or software operation such as the interaction with peripheral components or devices.

The processor 1030 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1030 may be configured to operate a memory array using a memory controller. In other cases, a memory controller may be integrated into the processor 1030. The processor 1030 may be configured to execute computer-readable instructions stored in a memory 1025 to perform various functions (e.g., functions or tasks supporting automatic feature selection and model generation for linear models).

Figure 11:
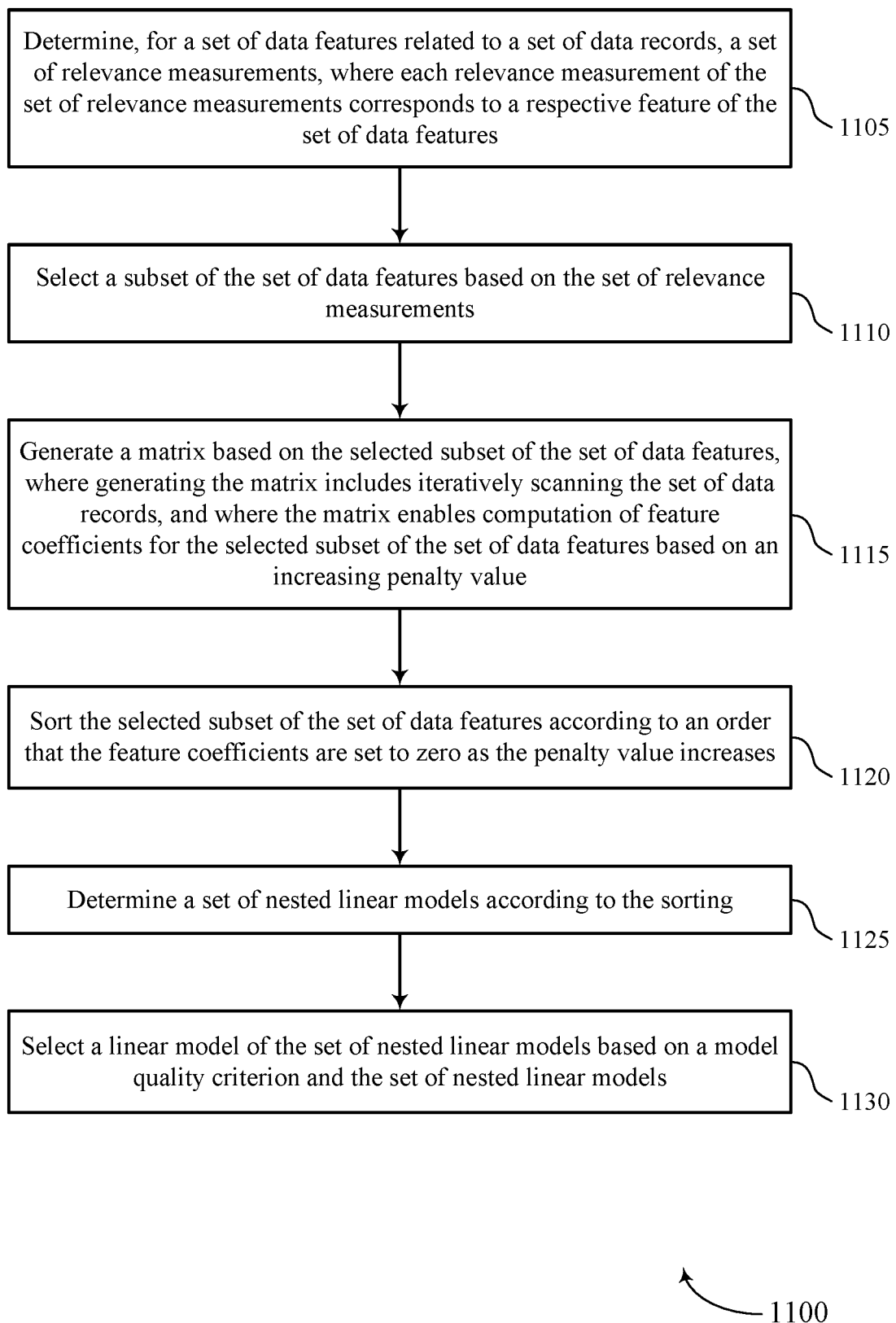
FIGS. 11 and 12 show flowcharts illustrating methods that support automatic feature selection and model generation for linear models in accordance with aspects of the present disclosure.

FIG. 11 shows a flowchart illustrating a method 1100 that supports automatic feature selection and model generation for linear models in accordance with aspects of the present disclosure. The operations of method 1100 may be implemented by a device (e.g., an application server, database server, server cluster, virtual machine, container, user device, database, etc.) or its components as described herein. For example, the operations of method 1100 may be performed by a feature selection module as described with reference to FIGS. 8 through 10. In some examples, a device may execute a set of instructions to control the functional elements of the device to perform the functions described below. Additionally or alternatively, a device may perform aspects of the functions described below using special-purpose hardware.

At 1105, the device may determine, for a set of data features related to a set of data records, a set of relevance measurements, where each relevance measurement of the set of relevance measurements corresponds to a respective feature of the set of data features. The operations of 1105 may be performed according to the methods described herein. In some examples, aspects of the operations of 1105 may be performed by a relevance measurement component as described with reference to FIGS. 8 through 10.

At 1110, the device may select a subset of the set of data features based on the set of relevance measurements. The operations of 1110 may be performed according to the methods described herein. In some examples, aspects of the operations of 1110 may be performed by a first cut component as described with reference to FIGS. 8 through 10.

At 1115, the device may generate a matrix based on the selected subset of the set of data features, where generating the matrix includes iteratively scanning the set of data records, and where the matrix enables computation of feature coefficients for the selected subset of the set of data features based on an increasing penalty value. The operations of 1115 may be performed according to the methods described herein. In some examples, aspects of the operations of 1115 may be performed by a matrix generation component as described with reference to FIGS. 8 through 10.

At 1120, the device may sort the selected subset of the set of data features according to an order that the feature coefficients are set to zero as the penalty value increases. The operations of 1120 may be performed according to the methods described herein. In some examples, aspects of the operations of 1120 may be performed by a sorting component as described with reference to FIGS. 8 through 10.

At 1125, the device may determine a set of nested linear models according to the sorting. The operations of 1125 may be performed according to the methods described herein. In some examples, aspects of the operations of 1125 may be performed by a nested linear model generator as described with reference to FIGS. 8 through 10.

At 1130, the device may select a linear model of the set of nested linear models based on a model quality criterion and the set of nested linear models. The operations of 1130 may be performed according to the methods described herein. In some examples, aspects of the operations of 1130 may be performed by a linear model selector as described with reference to FIGS. 8 through 10.

Figure 12:
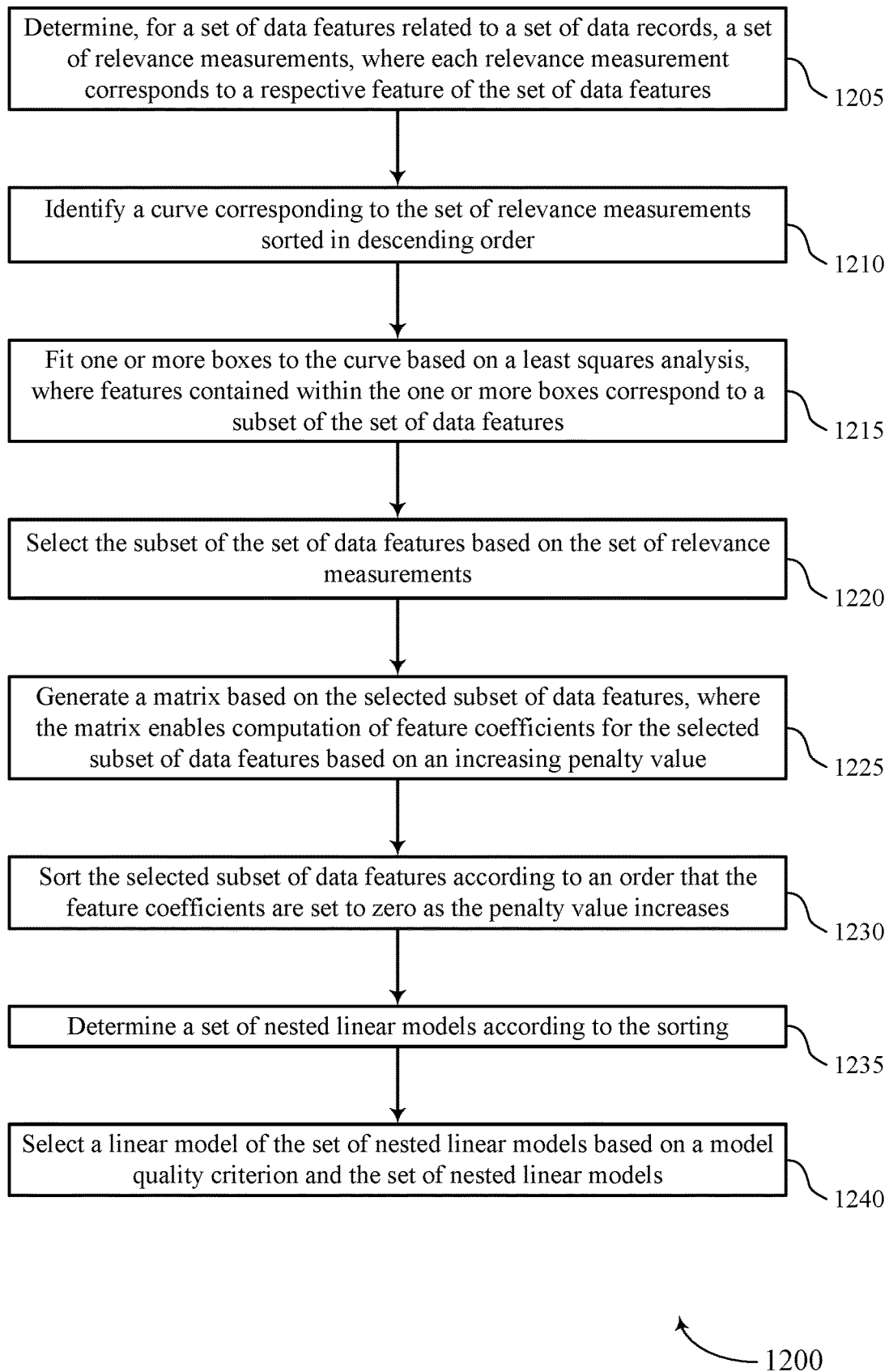

FIG. 12 shows a flowchart illustrating a method 1200 that supports automatic feature selection and model generation for linear models in accordance with aspects of the present disclosure. The operations of method 1200 may be implemented by a device or its components as described herein. For example, the operations of method 1200 may be performed by a feature selection module as described with reference to FIGS. 8 through 10. In some examples, a device may execute a set of instructions to control the functional elements of the device to perform the functions described below. Additionally or alternatively, a device may perform aspects of the functions described below using special-purpose hardware.

At 1205, the device may determine, for a set of data features related to a set of data records, a set of relevance measurements, where each relevance measurement of the set of relevance measurements corresponds to a respective feature of the set of data features. The operations of 1205 may be performed according to the methods described herein. In some examples, aspects of the operations of 1205 may be performed by a relevance measurement component as described with reference to FIGS. 8 through 10.

At 1210, the device may identify a curve corresponding to the set of relevance measurements sorted in descending order, where selecting the subset of the set of data features is further based on a shape of the curve. The operations of 1210 may be performed according to the methods described herein. In some examples, aspects of the operations of 1210 may be performed by a multi-box procedure component as described with reference to FIGS. 8 through 10.

At 1215, the device may fit one or more boxes (e.g., two boxes) to the curve based on a least squares analysis, where features contained within the one or more boxes correspond to the subset of the set of data features. The operations of 1215 may be performed according to the methods described herein. In some examples, aspects of the operations of 1215 may be performed by a multi-box procedure component as described with reference to FIGS. 8 through 10.

At 1220, the device may select a subset of the set of data features based on the set of relevance measurements. The operations of 1220 may be performed according to the methods described herein. In some examples, aspects of the operations of 1220 may be performed by a first cut component as described with reference to FIGS. 8 through 10.

At 1225, the device may generate a matrix based on the selected subset of the set of data features, where generating the matrix includes iteratively scanning the set of data records, and where the matrix enables computation of feature coefficients for the selected subset of the set of data features based on an increasing penalty value. The operations of 1225 may be performed according to the methods described herein. In some examples, aspects of the operations of 1225 may be performed by a matrix generation component as described with reference to FIGS. 8 through 10.

At 1230, the device may sort the selected subset of the set of data features according to an order that the feature coefficients are set to zero as the penalty value increases. The operations of 1230 may be performed according to the methods described herein. In some examples, aspects of the operations of 1230 may be performed by a sorting component as described with reference to FIGS. 8 through 10.

At 1235, the device may determine a set of nested linear models according to the sorting. The operations of 1235 may be performed according to the methods described herein. In some examples, aspects of the operations of 1235 may be performed by a nested linear model generator as described with reference to FIGS. 8 through 10.

At 1240, the device may select a linear model of the set of nested linear models based on a model quality criterion and the set of nested linear models. The operations of 1240 may be performed according to the methods described herein. In some examples, aspects of the operations of 1240 may be performed by a linear model selector as described with reference to FIGS. 8 through 10.

A method for automated feature selection for linear model generation is described. The method may include determining, for a set of data features related to a set of data records, a set of relevance measurements, where each relevance measurement of the set of relevance measurements corresponds to a respective feature of the set of data features, and selecting a subset of the set of data features based on the set of relevance measurements. The method may further include generating a matrix based on the selected subset of the set of data features, where generating the matrix includes iteratively scanning the set of data records, and where the matrix enables computation of feature coefficients for the selected subset of the set of data features based on an increasing penalty value, and sorting the selected subset of the set of data features according to an order that the feature coefficients are set to zero as the penalty value increases. Additionally, the method may include determining a set of nested linear models according to the sorting and selecting a linear model of the set of nested linear models based on a model quality criterion and the set of nested linear models.

An apparatus for automated feature selection for linear model generation is described. The apparatus may include a processor, memory in electronic communication with the processor, and instructions stored in the memory. The instructions may be executable by the processor to cause the apparatus to determine, for a set of data features related to a set of data records, a set of relevance measurements, where each relevance measurement of the set of relevance measurements corresponds to a respective feature of the set of data features, and select a subset of the set of data features based on the set of relevance measurements. The instructions may be further executable by the processor to cause the apparatus to generate a matrix based on the selected subset of the set of data features, where generating the matrix includes iteratively scanning the set of data records, and where the matrix enables computation of feature coefficients for the selected subset of the set of data features based on an increasing penalty value, and sort the selected subset of the set of data features according to an order that the feature coefficients are set to zero as the penalty value increases. Additionally, the instructions may be executable by the processor to cause the apparatus to determine a set of nested linear models according to the sorting and select a linear model of the set of nested linear models based on a model quality criterion and the set of nested linear models.

Another apparatus for automated feature selection for linear model generation is described. The apparatus may include means for determining, for a set of data features related to a set of data records, a set of relevance measurements, where each relevance measurement of the set of relevance measurements corresponds to a respective feature of the set of data features, and means for selecting a subset of the set of data features based on the set of relevance measurements. The apparatus may further include means for generating a matrix based on the selected subset of the set of data features, where generating the matrix includes iteratively scanning the set of data records, and where the matrix enables computation of feature coefficients for the selected subset of the set of data features based on an increasing penalty value, and means for sorting the selected subset of the set of data features according to an order that the feature coefficients are set to zero as the penalty value increases. Additionally, the apparatus may include means for determining a set of nested linear models according to the sorting and means for selecting a linear model of the set of nested linear models based on a model quality criterion and the set of nested linear models.

A non-transitory computer-readable medium storing code for automated feature selection for linear model generation is described. The code may include instructions executable by a processor to determine, for a set of data features related to a set of data records, a set of relevance measurements, where each relevance measurement of the set of relevance measurements corresponds to a respective feature of the set of data features, and select a subset of the set of data features based on the set of relevance measurements. The code may further include instructions executable by the processor to generate a matrix based on the selected subset of the set of data features, where generating the matrix includes iteratively scanning the set of data records, and where the matrix enables computation of feature coefficients for the selected subset of the set of data features based on an increasing penalty value, and sort the selected subset of the set of data features according to an order that the feature coefficients are set to zero as the penalty value increases. Additionally, the code may include instructions executable by the processor to determine a set of nested linear models according to the sorting and select a linear model of the set of nested linear models based on a model quality criterion and the set of nested linear models.

Some examples of the method, apparatuses, and non-transitory computer-readable medium described herein may further include operations, features, means, or instructions for identifying a curve corresponding to the set of relevance measurements sorted in descending order, where selecting the subset of the set of data features may be further based on a shape of the curve. In some examples of the method, apparatuses, and non-transitory computer-readable medium described herein, selecting the subset of the set of data features may include operations, features, means, or instructions for fitting one or more boxes to the curve based on a least squares analysis, where features contained within the one or more boxes correspond to the subset of the set of data features.

In some examples of the method, apparatuses, and non-transitory computer-readable medium described herein, generating the matrix based on the selected subset of the set of data features and sorting the selected subset of the set of data features according to the order that the feature coefficients are set to zero as the penalty value increases may include operations, features, means, or instructions for performing a LASSO regression procedure.

In some examples of the method, apparatuses, and non-transitory computer-readable medium described herein, iteratively scanning the set of data records may include operations, features, means, or instructions for performing batch processing on the set of data records stored in a database to generate the matrix.

In some examples of the method, apparatuses, and non-transitory computer-readable medium described herein, generating the matrix further may include operations, features, means, or instructions for reading a first subset of the set of data records and performing a first matrix building procedure using the first subset of the set of data records. Additionally, generating the matrix further may include operations, features, means, or instructions for reading a second subset of the set of data records and performing a second matrix building procedure using the second subset of the set of data records, where the matrix may be generated based on the first matrix building procedure and the second matrix building procedure. In some examples of the method, apparatuses, and non-transitory computer-readable medium described herein, the first subset of the set of data records and the second subset of the set of data records each may include a respective single data record.

In some examples of the method, apparatuses, and non-transitory computer-readable medium described herein, selecting the linear model further may include operations, features, means, or instructions for determining a first set of model quality criterion values for the set of nested linear models according to a first sampling interval, where a number of values in the first set of model quality criterion values may be less than a number of models in the set of nested linear models, identifying a model of the set of nested linear models corresponding to a minimum value of the first set of model quality criterion values, and determining a subset of the set of nested linear models based on the identified model and a threshold value, where the subset of the set of nested linear models includes the selected linear model. In some examples of the method, apparatuses, and non-transitory computer-readable medium described herein, the threshold value includes a model reduction factor for a rake sampling procedure, a feature range for the subset of the set of nested linear models, or a combination thereof.

In some examples of the method, apparatuses, and non-transitory computer-readable medium described herein, selecting the linear model further may include operations, features, means, or instructions for determining a second set of model quality criterion values for the subset of the set of nested linear models according to a second sampling interval, where a number of values in the second set of model quality criterion values may be less than a number of models in the subset of the set of nested linear models, identifying an additional model corresponding to a minimum value of the second set of model quality criterion values or the minimum value of the first set of model quality criterion values, and determining a further subset of the subset of the set of nested linear models based on the identified additional model and an additional threshold value, where the further subset of the subset of the set of nested linear models includes the selected linear model.

In some examples of the method, apparatuses, and non-transitory computer-readable medium described herein, selecting linear model further may include operations, features, means, or instructions for identifying that a sampling interval for a set of nested linear models corresponds to each model of the set of nested linear models, determining model quality criterion values for the set of nested linear models, and determining a minimum value of the model quality criterion values for the set of nested linear models, where the minimum value of the model quality criterion values for the set of nested linear models corresponds to the selected linear model.

Some examples of the method, apparatuses, and non-transitory computer-readable medium described herein may further include operations, features, means, or instructions for receiving, based on a user input, a set of user-selected features to remove from the set of data features and determining an initial subset of the set of data features according to the set of user-selected features to remove, where the subset of the set of data features may be selected from the initial subset of the set of data features.

Some examples of the method, apparatuses, and non-transitory computer-readable medium described herein may further include operations, features, means, or instructions for displaying the selected linear model, an indication of data features corresponding to the selected linear model, or both in a user interface. Some examples of the method, apparatuses, and non-transitory computer-readable medium described herein may further include operations, features, means, or instructions for transmitting, to a database, a user device, or a combination thereof, the selected linear model, an indication of data features corresponding to the selected linear model, or both.

In some examples of the method, apparatuses, and non-transitory computer-readable medium described herein, the set of relevance measurements includes a set of stump R-squared values. In some examples of the method, apparatuses, and non-transitory computer-readable medium described herein, the model quality criterion includes an AIC. In some examples of the method, apparatuses, and non-transitory computer-readable medium described herein, the set of data features includes single features, compound features, or a combination thereof.

In some examples of the method, apparatuses, and non-transitory computer-readable medium described herein, selecting the linear model involves two passes through the set of data records.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for automated feature selection for linear model generation at an application server, comprising:
    determining, for a set of data features related to a plurality of data records, a set of relevance measurements, wherein each relevance measurement of the set of relevance measurements corresponds to a respective feature of the set of data features;
    selecting a subset of the set of data features based at least in part on the set of relevance measurements;
    generating a matrix based at least in part on the selected subset of the set of data features, wherein generating the matrix comprises iteratively scanning the plurality of data records, and wherein the matrix enables computation of feature coefficients for the selected subset of the set of data features based at least in part on an increasing penalty value;
    sorting the selected subset of the set of data features based at least in part on the increasing penalty value, wherein a first data feature of the subset of data features has a greater priority than a second data feature of the subset of data features based at least in part on the first data feature being set to zero later than the second data feature;
    determining, according to the sorting, a plurality of nested linear models comprising a first nested linear model and a second nested linear model, wherein the first nested linear model comprises the first data feature and the second nested linear model comprises the first data feature and the second data feature; and
    selecting a linear model of the plurality of nested linear models based at least in part on a model quality criterion comprising an Akaike information criterion (AIC) and the plurality of nested linear models.

2. The method of claim 1, further comprising:
    identifying a curve corresponding to the set of relevance measurements sorted in descending order, wherein selecting the subset of the set of data features is further based at least in part on a shape of the curve.

3. The method of claim 2, wherein selecting the subset of the set of data features comprises:
    fitting one or more boxes to the curve based at least in part on a least squares analysis, wherein features contained within the one or more boxes correspond to the subset of the set of data features.

4. The method of claim 1, wherein generating the matrix based at least in part on the selected subset of the set of data features and sorting the selected subset of the set of data features comprise:
    performing a least absolute shrinkage and selection operator (LASSO) regression procedure.

5. The method of claim 1, wherein iteratively scanning the plurality of data records comprises:
    performing batch processing on the plurality of data records stored in a database to generate the matrix.

6. The method of claim 1, wherein generating the matrix further comprises:
    reading a first subset of the plurality of data records;
    performing a first matrix building procedure using the first subset of the plurality of data records;
    reading a second subset of the plurality of data records; and
    performing a second matrix building procedure using the second subset of the plurality of data records, wherein the matrix is generated based at least in part on the first matrix building procedure and the second matrix building procedure.

7. The method of claim 6, wherein the first subset of the plurality of data records and the second subset of the plurality of data records each comprise a respective single data record.

8. The method of claim 1, wherein selecting the linear model further comprises:
    determining a first set of model quality criterion values for the plurality of nested linear models according to a first sampling interval, wherein a number of values in the first set of model quality criterion values is less than a number of models in the plurality of nested linear models;
    identifying a model of the plurality of nested linear models corresponding to a minimum value of the first set of model quality criterion values; and
    determining a subset of the plurality of nested linear models based at least in part on the identified model and a threshold value, wherein the subset of the plurality of nested linear models comprises the selected linear model.

9. The method of claim 8, wherein selecting the linear model further comprises:
    determining a second set of model quality criterion values for the subset of the plurality of nested linear models according to a second sampling interval, wherein a number of values in the second set of model quality criterion values is less than a number of models in the subset of the plurality of nested linear models;
    identifying an additional model corresponding to a minimum value of the second set of model quality criterion values or the minimum value of the first set of model quality criterion values; and
    determining a further subset of the subset of the plurality of nested linear models based at least in part on the identified additional model and an additional threshold value, wherein the further subset of the subset of the plurality of nested linear models comprises the selected linear model.

10. The method of claim 9, wherein selecting linear model further comprises:
identifying that a sampling interval for a set of nested linear models corresponds to each model of the set of nested linear models;
determining model quality criterion values for the set of nested linear models; and
determining a minimum value of the model quality criterion values for the set of nested linear models, wherein the minimum value of the model quality criterion values for the set of nested linear models corresponds to the selected linear model.

11. The method of claim 8, wherein the threshold value comprises a model reduction factor for a rake sampling procedure, a feature range for the subset of the plurality of nested linear models, or a combination thereof.

12. The method of claim 1, further comprising:
receiving, based at least in part on a user input, a set of user-selected features to remove from the set of data features; and
determining an initial subset of the set of data features according to the set of user-selected features to remove, wherein the subset of the set of data features is selected from the initial subset of the set of data features.

13. The method of claim 1, further comprising:
displaying the selected linear model, an indication of data features corresponding to the selected linear model, or both in a user interface.

14. The method of claim 1, further comprising:
transmitting, to a database, a user device, or a combination thereof, the selected linear model, an indication of data features corresponding to the selected linear model, or both.

15. The method of claim 1, wherein the set of relevance measurements comprises a set of stump R-squared values.

16. The method of claim 1, wherein the AIC comprises at least one of an AIC with a correction for small sample sizes (AICc), an adjusted R-squared, a Mallows's $C_p$, a Bayesian information criterion (BIC), a Hannan-Quinn information criterion (HQIC), a minimum description length (MDL), a standard error of regression, or a combination thereof.

17. The method of claim 1, wherein the set of data features comprises single features, compound features, or a combination thereof.

18. The method of claim 1, wherein selecting the linear model comprises two passes through the plurality of data records.

19. An apparatus for automated feature selection for linear model generation, comprising:
a processor;
memory in electronic communication with the processor; and
instructions stored in the memory and executable by the processor to cause the apparatus to:
determine, for a set of data features related to a plurality of data records, a set of relevance measurements, wherein each relevance measurement of the set of relevance measurements corresponds to a respective feature of the set of data features;
select a subset of the set of data features based at least in part on the set of relevance measurements;
generate a matrix based at least in part on the selected subset of the set of data features, wherein generating the matrix comprises iteratively scanning the plurality of data records, and wherein the matrix enables computation of feature coefficients for the selected subset of the set of data features based at least in part on an increasing penalty value;
sort the selected subset of the set of data features based at least in part on the increasing penalty value, wherein a first data feature of the subset of data features has a greater priority than a second data feature of the subset of data features based at least in part on the first data feature being set to zero later than the second data feature;
determine, according to the sorting, a plurality of nested linear models comprising a first nested linear model and a second nested linear model, wherein the first nested linear model comprises the first data feature and the second nested linear model comprises the first data feature and the second data feature; and
select a linear model of the plurality of nested linear models based at least in part on a model quality criterion comprising an Akaike information criterion (AIC) and the plurality of nested linear models.

20. A non-transitory computer-readable medium storing code for automated feature selection for linear model generation, the code comprising instructions executable by a processor to:
determine, for a set of data features related to a plurality of data records, a set of relevance measurements, wherein each relevance measurement of the set of relevance measurements corresponds to a respective feature of the set of data features;
select a subset of the set of data features based at least in part on the set of relevance measurements;
generate a matrix based at least in part on the selected subset of the set of data features, wherein generating the matrix comprises iteratively scanning the plurality of data records, and wherein the matrix enables computation of feature coefficients for the selected subset of the set of data features based at least in part on an increasing penalty value;
sort the selected subset of the set of data features based at least in part on the increasing penalty value, wherein a first data feature of the subset of data features has a greater priority than a second data feature of the subset of data features based at least in part on the first data feature being set to zero later than the second data feature;
determine, according to the sorting, a plurality of nested linear models comprising a first nested linear model and a second nested linear model, wherein the first nested linear model comprises the first data feature and the second nested linear model comprises the first data feature and the second data feature; and
select a linear model of the plurality of nested linear models based at least in part on a model quality criterion comprising an Akaike information criterion (AIC) and the plurality of nested linear models.

* * * * *